(12) United States Patent
Suzuki

(10) Patent No.: US 7,729,960 B2
(45) Date of Patent: Jun. 1, 2010

(54) COMMUNICATION TERMINAL, POWER SUPPLY MANAGEMENT SYSTEM OF THE SAME, AND CHARGING METHOD AT THE TIME OF PURCHASING FUEL RESERVOIR

(75) Inventor: Takahiro Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1290 days.

(21) Appl. No.: 11/229,120

(22) Filed: Sep. 19, 2005

(65) Prior Publication Data

US 2006/0222913 A1 Oct. 5, 2006

(30) Foreign Application Priority Data

Mar. 30, 2005 (JP) ............... 2005-097061

(51) Int. Cl.
*G06Q 20/00* (2006.01)
*H01M 8/00* (2006.01)
*B65B 1/30* (2006.01)

(52) U.S. Cl. ............... 705/30; 429/12; 141/94; 705/34; 705/16

(58) Field of Classification Search ............ 429/12; 141/94
See application file for complete search history.

(56) References Cited

U.S. PATENT DOCUMENTS

| 6,085,805 | A | * | 7/2000 | Bates ............... 141/94 |
| 6,713,201 | B2 | | 3/2004 | Bullock et al. |
| 2004/0175598 | A1 | * | 9/2004 | Bliven et al. ............ 429/12 |

FOREIGN PATENT DOCUMENTS

| JP | 2002-280044 | 9/2002 |
| JP | 2003-45468 | 2/2003 |
| JP | 2003-49996 | 2/2003 |
| JP | 2004-247995 | 9/2004 |
| JP | 2004-265787 | 9/2004 |

* cited by examiner

*Primary Examiner*—F. Ryan Zeender
*Assistant Examiner*—Denisse Ortiz Roman
(74) *Attorney, Agent, or Firm*—Oblon, Spivak, McClelland, Maier & Neustadt, L.L.P.

(57) ABSTRACT

A communication terminal, to which a power is supplied from the fuel cell, includes an ID detecting unit that detects at least one of unique identification information of a fuel reservoir for supplying fuel to the fuel cell and unique identification information of the fuel cell, a content detecting unit that detects a content executed in the communication terminal, a cell driving detecting unit that detects an operating state of the fuel cell, and a matching process unit that collates and associates with each other data obtained from the ID detecting unit the content detecting unit and the cell driving detecting unit.

4 Claims, 17 Drawing Sheets

MOUNTING OPERATION 1

MOUNTING OPERATION 2

AFTER MOUNTING

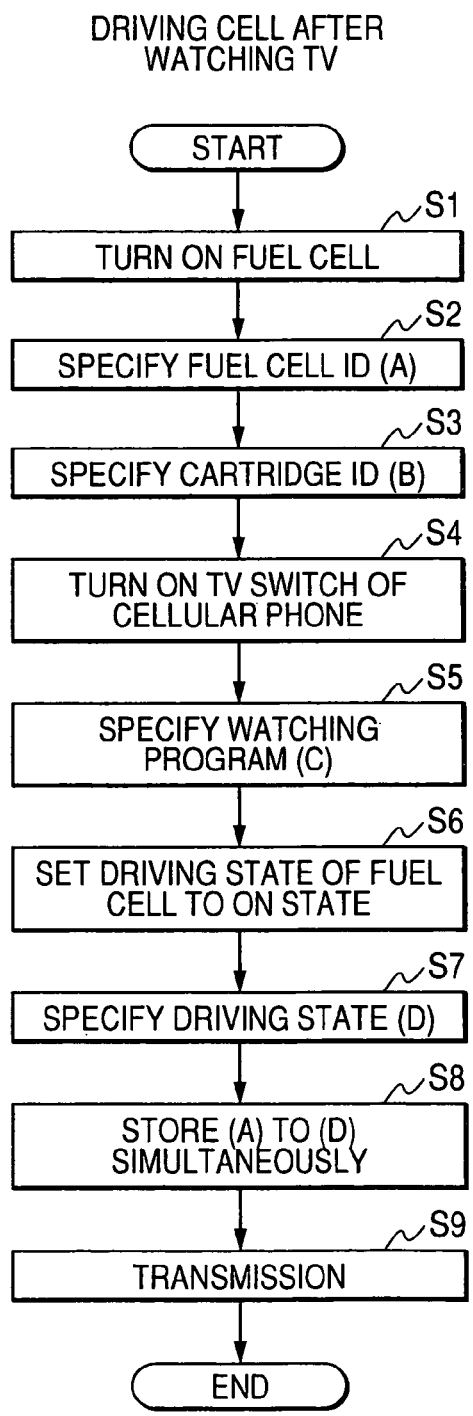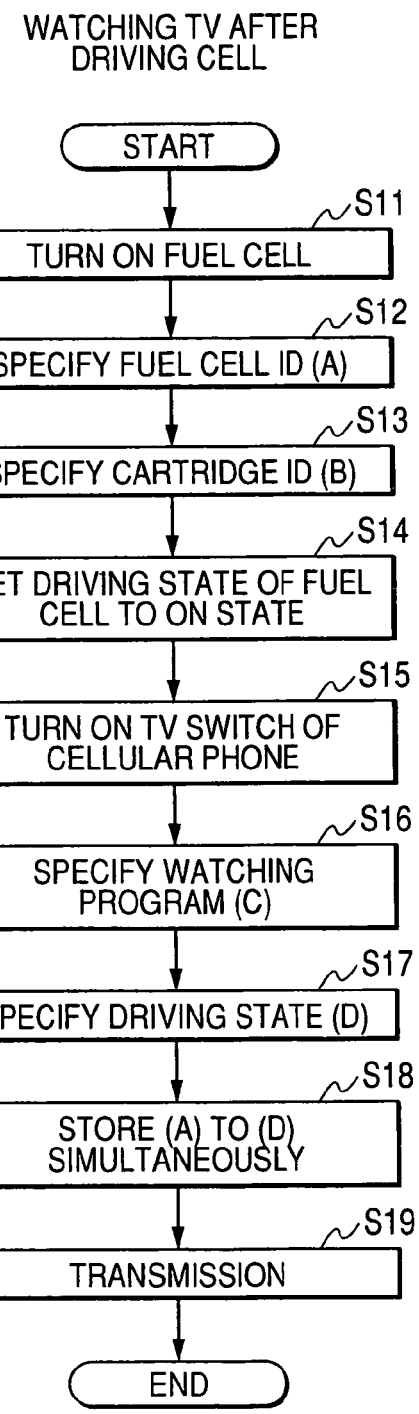

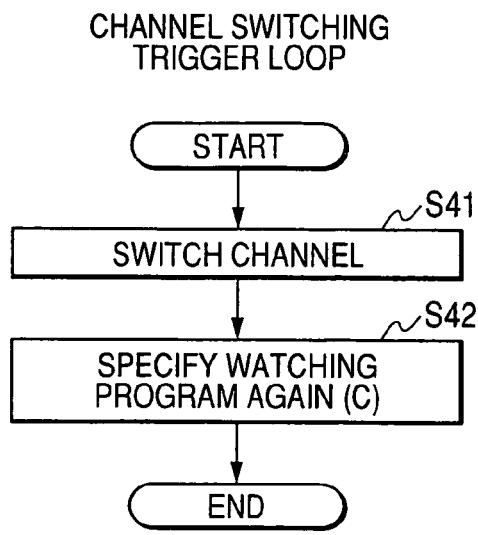
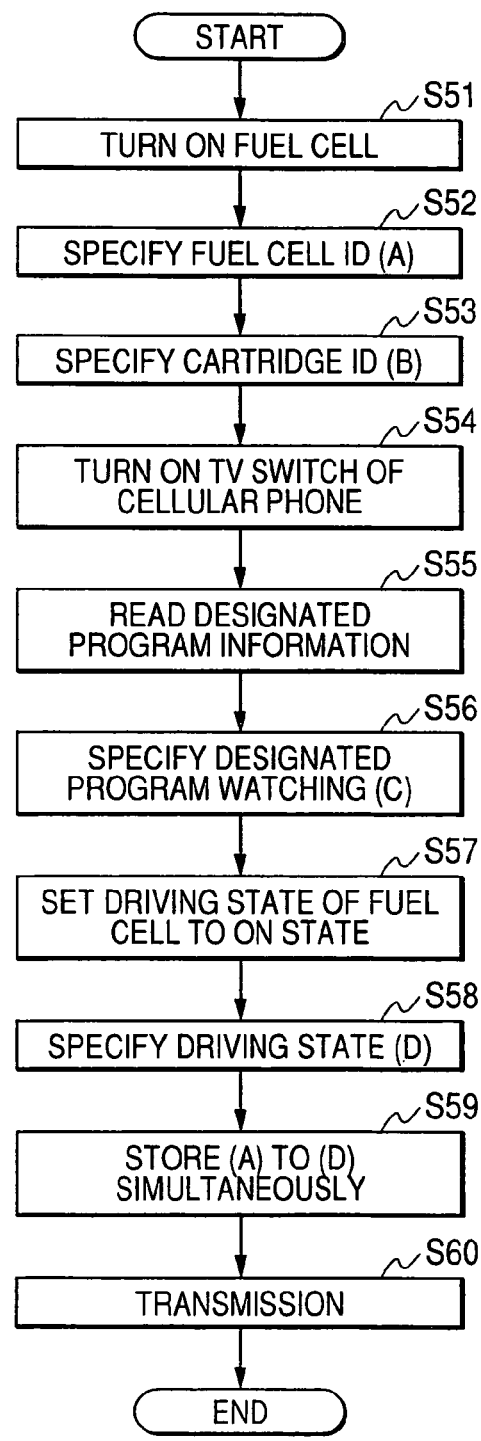

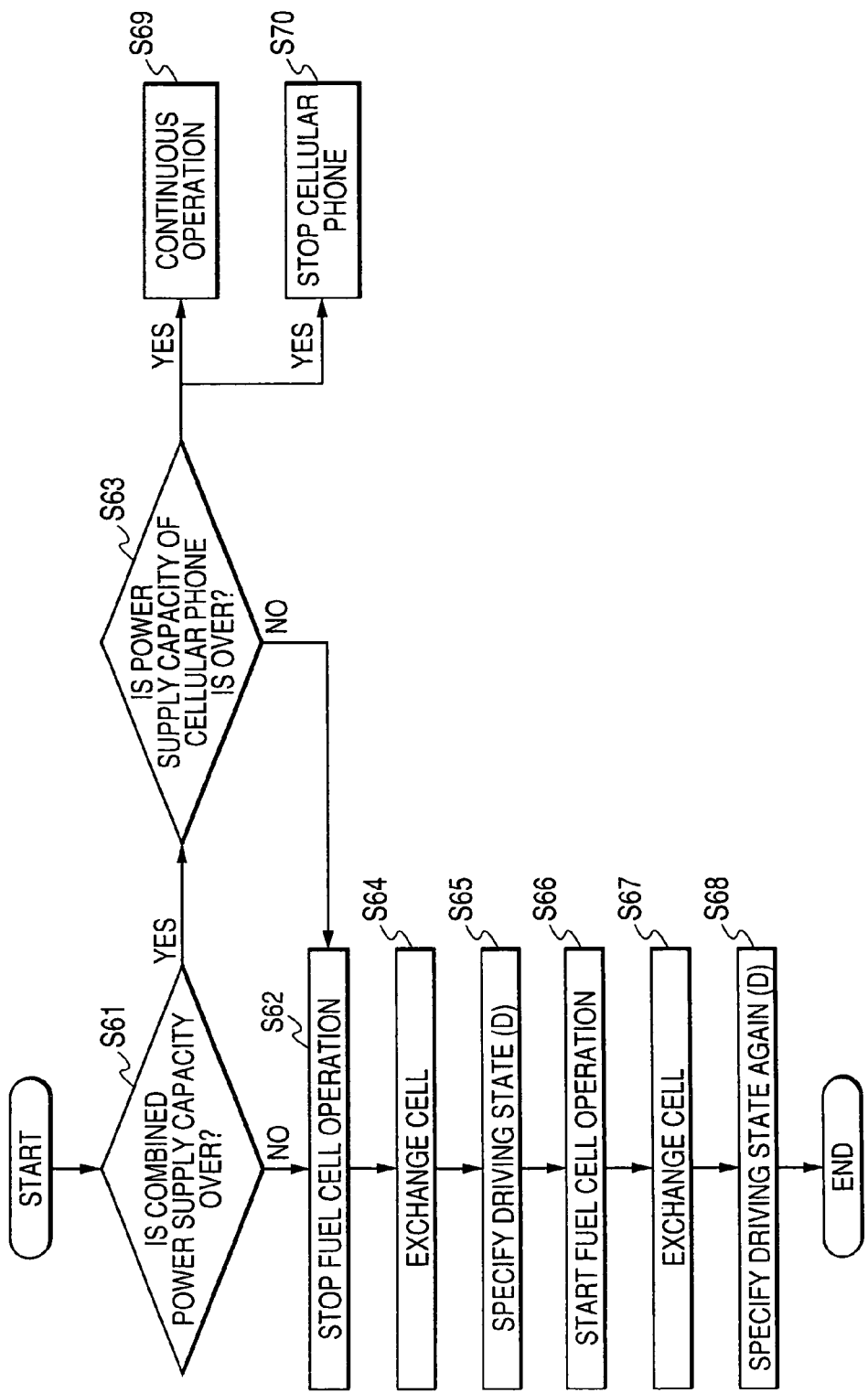

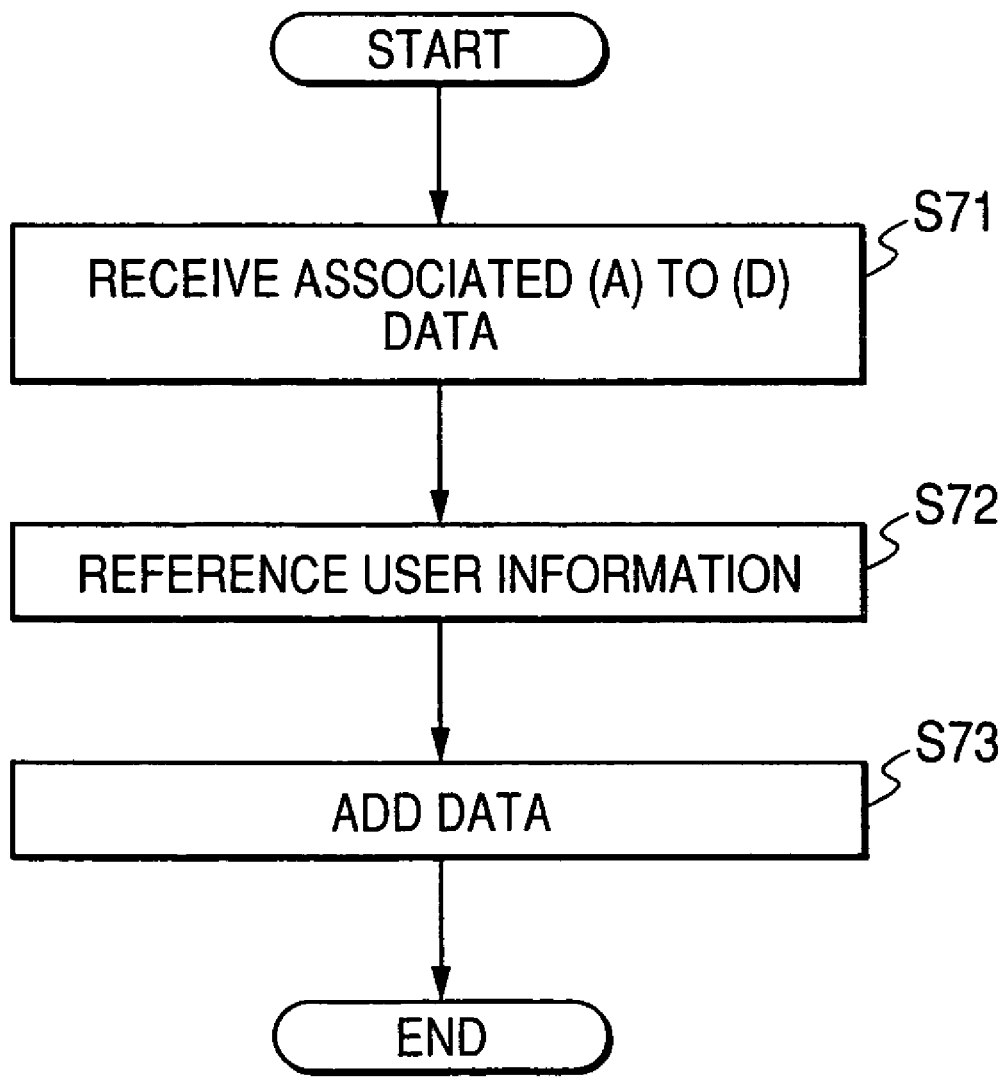

DRIVING CELL AFTER WATCHING TV

WATCHING TV AFTER DRIVING CELL

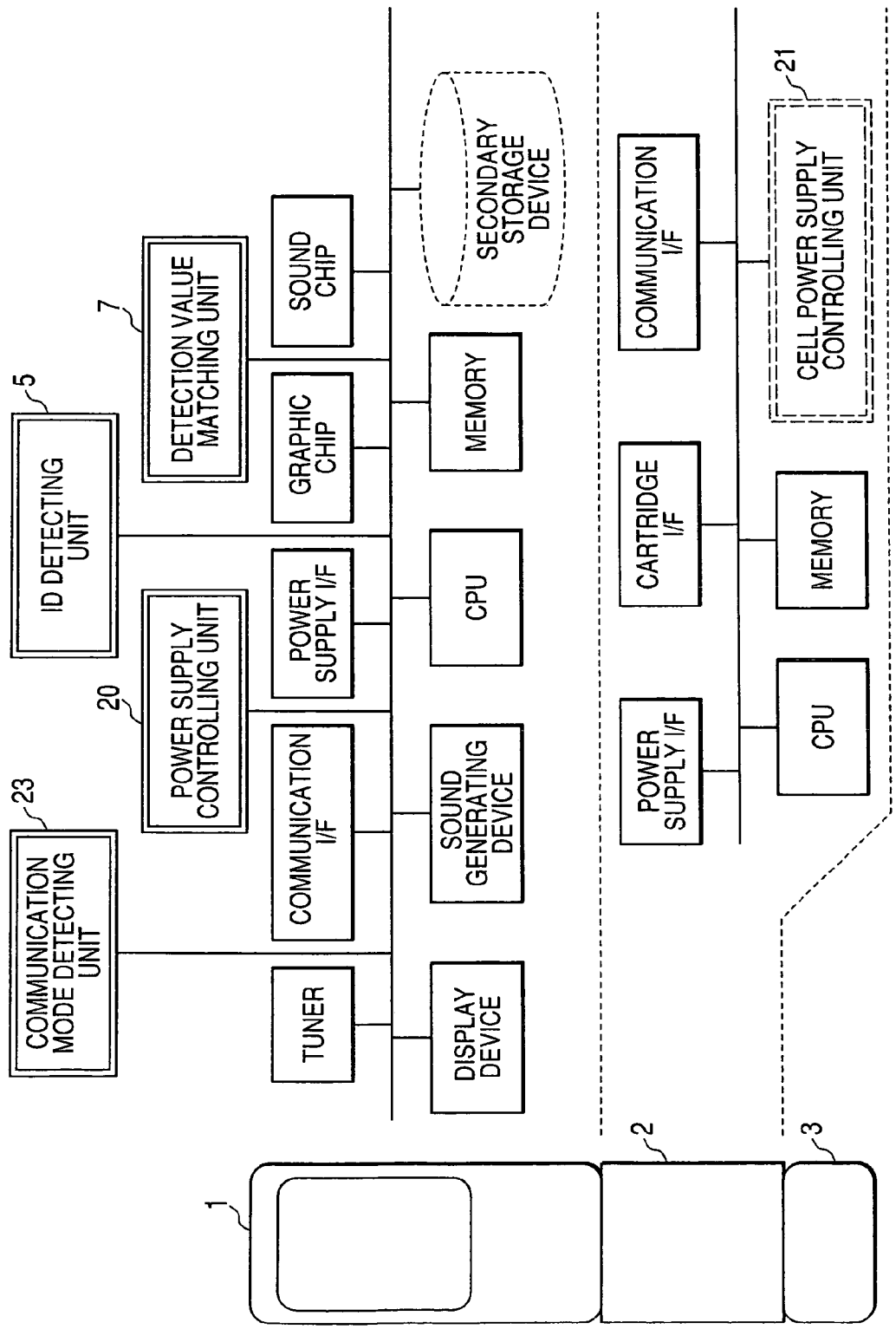

DRIVING FUEL CELL AFTER P2P COMMUNICATION

P2P COMMUNICATION AFTER DRIVING FUEL CELL

COMMUNICATION TERMINAL, POWER SUPPLY MANAGEMENT SYSTEM OF THE SAME, AND CHARGING METHOD AT THE TIME OF PURCHASING FUEL RESERVOIR

CROSS REFERENCE TO RELATED APPLICATIONS

This application is based upon and claims the benefit of priority from the prior Japanese Patent Application No. 2005-97061 filed on Mar. 30, 2005; the entire contents of which are incorporated herein by reference.

BACKGROUND OF THE INVENTION

1. Field of the Invention

The present invention relates to a communication terminal, a power supply management system of the same, and a charging method at the time of purchasing a cell reservoir.

2. Description of the Related Art

In recent years, a fuel cell has been actively researched and developed for converting chemical energy having fuel such as hydrogen, hydrocarbon or alcohol into electrical energy through an electrochemical reaction. This is because the fuel cell can convert the fuel into electrical energy directly and thus can be composed of an electricity generating device with high efficiency and low environmental pollution.

In addition, a direct methanol fuel cell (hereinafter, referred to as 'DMFC') has attracted public attention in which the liquid fuel at room temperature is not deformed by hydrogen gas and is directly oxidized in a cell electrode, and electrical energy is extracted (for example, see JP-A-2004-265787). This is because the DMFC can be easily made a small-size, can be operated at a relatively low temperature (40 to 60° C.), can generate electricity as long as liquid fuel such as methanol is continuously supplied, and can achieve high output. In addition, since the DMFC allows information processing devices such as a mobile personal computer (PC) and a mobile device such as a cellular phone to be driven for a long time, and it is anticipated that it will be substituted as a storage cell according to the related art.

As well known, an electromotive unit of the DMFC has a structure in which a plurality of cells each composed of an anode electrode and a cathode electrode with an electrolyte film interposed therebetween are laminated. Here, a methanol aqueous solution used as fuel is supplied to the anode electrode side and air (oxygen) is supplied to the cathode electrode side, so that electricity is generated.

In addition, in order to stably perform the electricity generation at the electromotive unit, in addition to the base structure, devices of a control system, a piping system, and an exhaust system, a warning device, or the like, which will be described in more details below, are disposed, and a system of the fuel cell is formed. A fuel cartridge in which high-concentrated methanol raw fuel becoming the electromotive fuel is filled is attached to the fuel cell so as to be attachable and detachable.

In recent years, a technology has been suggested in which in the fuel cell system including the fuel cartridge, data related to the type of used fuel, the amount of used fuel or a manufacturer, and various information, such as information related to commercial transaction, are extracted (for example, see U.S. Pat. No. 6,713,201). In addition, the fuel cell has been examined for system informationization or advancing capable of achieving information exchange as well as power supply with respect to a portable device to which the fuel cell is attached.

In addition to the DMFC suitable for the portable device, as the fuel cell, various fuel cells, such as a polymer electrolyte fuel cell (PEFC) in which an ion exchanging resin film using oxygen as fuel is constructed as an electrolyte, have been suggested.

However, generally, the fuel used in the fuel cell is a harmful material and a hazardous material. For this reason, for example, the high-concentrated methanol raw fuel filled in the fuel reservoir (fuel cartridge) of the fuel cell is currently set to have a reference of 200 ppm or less every 8 hours per day as an occupational health exposure limit. However, when the fuel reservoir is commonly used on a daily basis, the regulation becomes strict in order to prevent chronic poisoning. There are many cases that people are affected even at 30 ppm. Currently, there has been reported that exposure is several tens of ppm in the atmosphere of cities. Therefore, there is a high possibility that in the future, a regulation exposure limit will be set at several ppm.

In addition, it is necessary that a safety measure against the harmful material/hazardous material be provided in the fuel reservoir. Even though a large amount of the fuel reservoirs are sold on the market as disposable ampules, it is difficult that they are manufactured at a low cost, and it is anticipated that they will become high-priced due to the added value of utilizing the exchange of information. In addition, if the fuel reservoir becomes too expensive to make disposal ampules, it becomes difficult for the portable DMFC to be widely used.

Accordingly, a method has been suggested to solve the above-mentioned problems. One method is that the fuel cartridge is charged to other people other than a user of the fuel cell or a purchaser of the fuel reservoir. There is an effective system in which for the subject the fuel cell of the user consumes a power, for example, the contents that are executed in the communication terminal by the user and are distributed through the communication infrastructure including the internet, the content provider is charged with the expenses. This system is suitable for an information processing device like a communication terminal connected to the communication infrastructure such as the network.

However, in the communication terminal to which the power is supplied from the fuel cell, there is no mechanism that the execution of various contents becoming the subject of the power consumption is collated and associated with the fuel cell or the fuel reservoir used in the communication terminal. For this reason, there is a large problem in that the content provider, the communication carrier, and the fuel reservoir manufacturer do not cooperate with each other, and a service such as division of the expenses of the fuel reservoir or the profit division is not performed.

Accordingly, the invention has been made to solve the above-mentioned problems and it is an object of the invention to promote fast wide use of a fuel cell and a fuel reservoir thereof which can manufacture the fuel reservoir of the fuel cell at a low cost and can be suitable for a power supply of a mobile device. Further, it is another object of the invention to provide a communication terminal which can be widely used, a power supply management system thereof, and a charging method at the time of purchasing the fuel reservoir.

SUMMARY OF THE INVENTION

According to an aspect of the invention, a communication terminal, to which a power is supplied from the fuel cell, includes an ID detecting unit that detects at least one of ID of a fuel reservoir for supplying fuel to the fuel cell and ID of the fuel cell, a content detecting unit that detects contents executed in the communication terminal, a cell driving detecting unit that detects an operating state of the fuel cell, and a matching process unit that collates and associates with each other the data obtained from the ID detecting unit, the content detecting unit, and the cell driving detecting unit.

According to another aspect of the invention, a communication terminal, to which a power is supplied from the fuel cell, includes an ID detecting unit that detects ID of a fuel reservoir for supplying fuel to the fuel cell or ID of the fuel cell, a content detecting unit that detects contents executed in the communication terminal, and a power supply controlling unit that changes a power supply path to the fuel cell in accordance with execution of specific contents in the communication terminal.

According to another aspect of the invention, a communication terminal, to which a power is supplied from the fuel cell, includes an ID detecting unit that detects ID of a fuel reservoir for supplying fuel to the fuel cell or ID of the fuel cell, and an output controlling unit that allows specific contents to be executed based on the IDs detected by the ID detecting unit.

According to another aspect of the invention, a communication terminal, to which a power is supplied from the fuel cell and which performs P2P (Peer-to-Peer) communication, includes an ID detecting unit that detects ID of a fuel reservoir for supplying fuel to the fuel cell or ID of the fuel cell, a cell driving detecting unit that detects an operating state of the fuel cell, a data comparison unit that compares an amount of data that a user of the communication terminal actively transmits and receives with an amount of data transmitted and received through the communication terminal such that another user performing the P2P communication transmits and receives the data, and a matching process unit that collates and associates with each other the data obtained from the ID detecting unit, the cell driving detecting unit, and the data comparison unit.

According to another aspect of the invention, a communication terminal, to which a power is supplied from the fuel cell and which performs P2P communication, includes an ID detecting unit that detects ID of a fuel reservoir for supplying fuel to the fuel cell or ID of the fuel cell, a cell driving detecting unit that detects an operating state of the fuel cell, a mode detecting unit that detects whether a communication mode of the communication terminal is a P2P communication mode, and a power supply controlling unit that changes a power supply path to the fuel cell when the communication mode of the communication terminal is the P2P communication mode.

According to another aspect of the invention, a power supply management system of a communication terminal to which a power is supplied from the fuel cell, the communication terminal includes an ID detecting unit that detects ID of a fuel reservoir for supplying fuel to the fuel cell or ID of the fuel cell, a content detecting unit that detects contents executed in the communication terminal, a cell driving detecting unit that detects an operating state of the fuel cell, and a matching process unit that collates the data obtained from the ID detecting unit, the content detecting unit, and the cell driving detecting unit.

According to another aspect of the invention, a charging method of a fuel reservoir at the time of purchasing the fuel reservoir which supplies fuel to a fuel cell supplying a power to a communication terminal, includes collating ID data of the fuel cell or the fuel reservoir, content information data executed in the communication terminal, and consumed fuel information data obtained by an operation situation of the fuel cell, creating electronic data obtained by associating, with each other, the ID data, the content information data, and the consumed fuel information data, storing the electronic data created by collating and associating the data in a management system of the communication terminal and a content supply side, and calculating shared expenses of the content supply side so as to charge the shared expenses based on the stored electronic data at the time of purchasing the fuel reservoir.

Through the above-mentioned aspects of the invention, it is possible to manufacture the fuel reservoir of the fuel cell at a low cost, and in particular, it is possible to promote fast wide use of the mobile fuel cell suitable for a power supply of the mobile device and the fuel reservoir thereof. In addition, it is possible to provide the communication terminal, the power supply management system thereof, and a charging method of purchasing the fuel reservoir, which results into facilitating the wide use.

BRIEF DESCRIPTION OF THE DRAWINGS

FIGS. 4A and 4B are flowcharts illustrating the operation of the communication terminal and the power supply management system of the fuel cell according to the first embodiment;

FIGS. 7A and 7B are flowcharts illustrating another operation of the communication terminal and the power supply management system of the fuel cell;

FIG. 8 is a flowchart illustrating another operation of the communication terminal and the power supply management system of the fuel cell;

FIG. 9 is a flowchart illustrating another operation of the communication terminal and the power supply management system of the fuel cell;

FIG. 16 is a block diagram schematically showing a structure of a communication terminal and a power supply management system of a fuel cell according to a fifth embodiment of the invention.

DETAILED DESCRIPTION OF THE INVENTION

Figure 1:
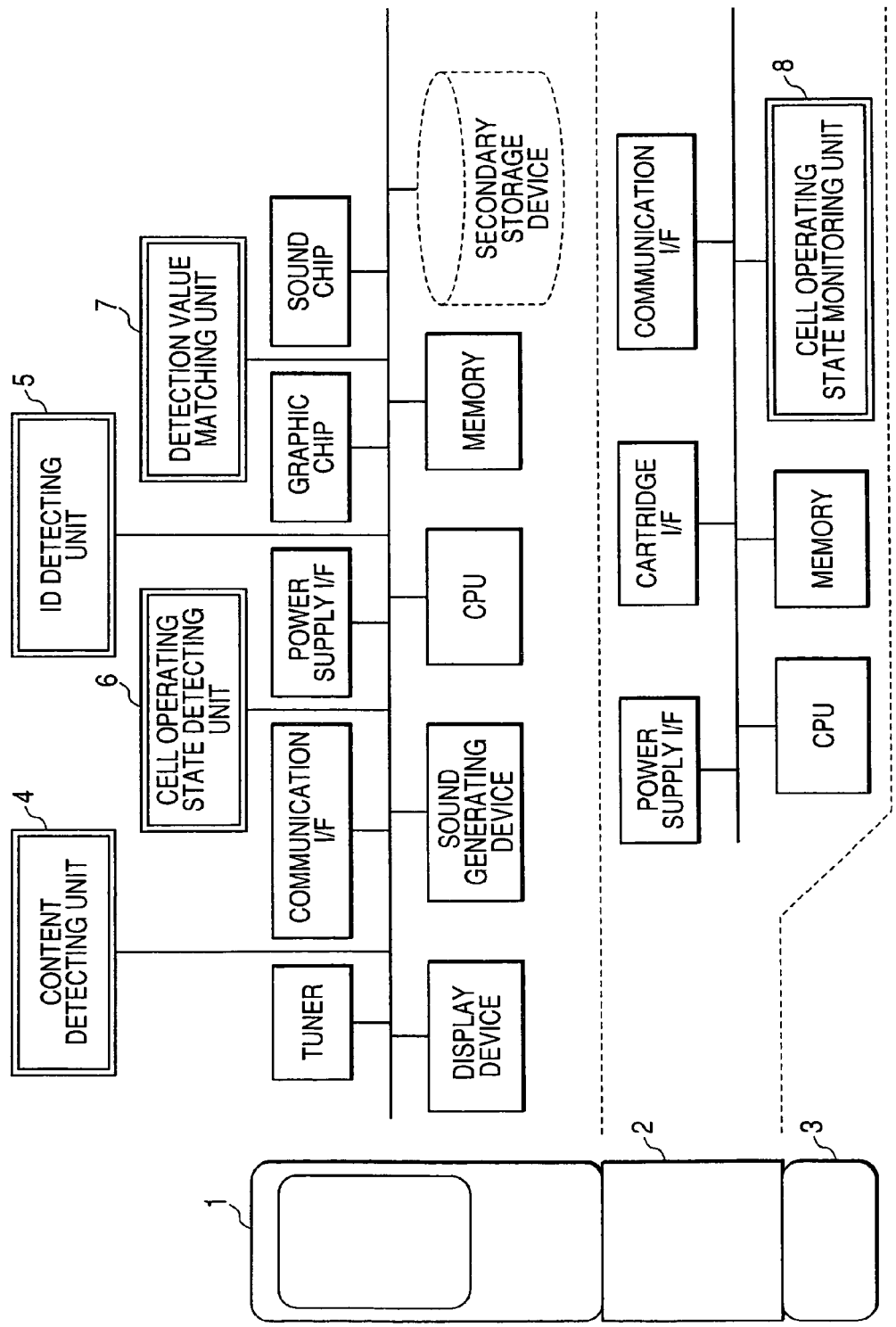
FIG. 1 is a block diagram schematically showing a structure of a communication terminal and a power supply management system of a fuel cell according to a first embodiment of the invention.

Hereinafter, preferred embodiments of the invention will be described in detail with reference to the accompanying drawing. Here, the same or similar elements are denoted by common reference numerals, and description thereof will be omitted.

First Embodiment

FIG. 1 is a block diagram schematically showing a communication terminal and a simplified power supply management system thereof according to a first embodiment of the invention. Here, examples of the communication terminal are not particularly limited, and may be a PC, a mobile computer, a personal digital assistant (PDA), a music player, a cellular phone or the like. In the first embodiment described below, the cellular phone is used as the communication terminal.

As shown in FIG. 1, a cellular phone 1 or a power supply management system thereof includes a content detecting unit 4 that detects a state in which various contents are reproduced, is processed or executed (it means that contents are collectively executed), an ID detecting unit 5 that detects identification information (IDs) of a fuel cell 2 and a fuel cartridge (fuel reservoir) 3, a cell operating state detecting unit (fuel driving detecting unit) 6 that detects a power supply state from the fuel cell, and a detection value matching unit (matching processing unit) 7 that collates the detected information (data), associates them with each other, and integrates them.

Here, the content detecting unit 4 has a function for detecting an execution state of various contents supplied through TV programs, communication infrastructures such as the internet, and separately provided units such as storage media. These contents are reproduced and executed through electronic components such as a communication I/F, a tuner, a graphic chip, and a sound chip shown in FIG. 1.

Examples of the contents may be music, a movie, a novel, a database, metadata, an operating system, application software, an updating program or the like. The examples of the contents described above are information which can be electronized, can be processed by electronic apparatuses such as an information processing device or a portable terminal, and can be executed. In addition, these contents are supplied from distribution sites of a content provider or a communication carrier to a cellular phone which is a communication terminal of a user.

The ID detecting unit 5 detects unique identification information (IDs) assigned to the fuel cell 2 and the fuel cartridge 3, and transmits the detected ID information to a memory unit built in the cellar phone 1 so as to be stored therein. The fuel cell 2 and the fuel cartridge 3 are manufactured by a fuel cell manufacturer and a fuel reservoir manufacturer and are assigned with respective IDs.

The cell operating state detecting unit 6 detects and records an operation situation of the fuel cell 2, that is, an operation time, an output and an amount of consumed fuel. In addition, the recorded data is stored in, for example, a secondary storage unit. In addition, the cell operating state detecting unit 6 can detect an amount of raw fuel replenished from the fuel cartridge 3 to the fuel cell 2.

The detection value matching unit 7 collates time data of various content execution detected from the content detecting unit 4, IDs of the fuel cell 2 or the fuel cartridge 3 detected from the ID detecting unit 5, and operation time data, output data and consumed fuel data detected from the cell operating state detecting unit 6. In addition, the detecting value matching unit 7 performs an operation process on an amount of fuel or an amount of raw fuel consumed when the cellular phone is driven in order to execute the various contents, calculates the amount of consumed fuel or the amount of consumed raw fuel, and set them as electronic information of corresponding IDs. In this way, the detection value matching unit 7 collates the information data obtained from the content detecting unit 4, the ID detecting unit 5, and the cell operating state detecting unit 6, associates them with each other, and stores them as electronic data.

In addition, in addition to the above-mentioned elements, the cellular phone 1 includes a CPU, a cache memory, a secondary storage unit, a display unit, and a sound generating unit, if necessary. In addition, the cellular phone 1 has a built-in storage cell like a lithium ion cell.

Further, the fuel cell 2 has a cell operating state monitoring unit 8 corresponding to the above-mentioned cell operating state detecting unit 6. Furthermore, the fuel cell 2 is constructed as a system having a cartridge I/F, a CPU, a memory unit, a communication I/F, and a power supply I/F constituting a control system such as information, a power supply or the like.

In addition, the fuel cartridge 3 is a fuel reservoir, and has a cartridge I/F and a memory unit for exchanging information (not shown).

Figure 2A:
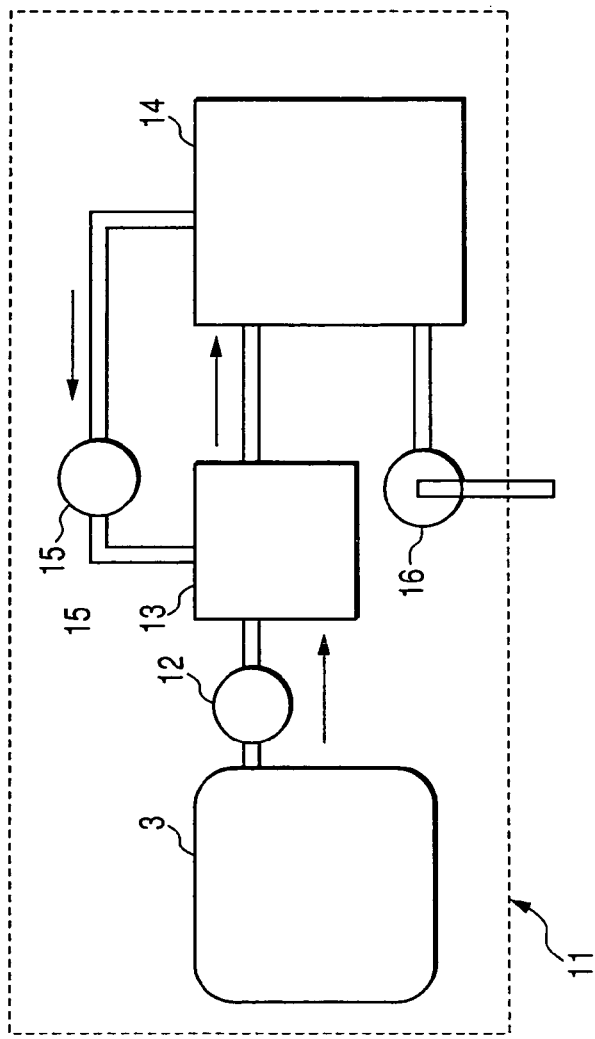
FIG. 2A is a block diagram schematically showing a structure of a fuel system for explaining a fuel cell.
Figure 2B:
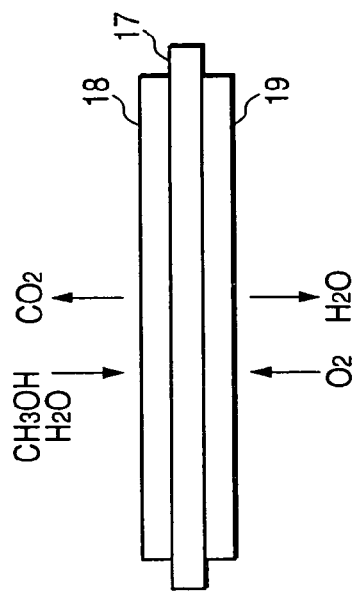
FIG. 2B is a schematic cross-sectional view showing a principle of an electromotive unit of the fuel cell of FIG. 2A.

Here, the basic structure of a fuel cell system will be described in brief with reference to FIGS. 2A and 2B. In this case, the fuel cell system is a DMFC type in which a methanol aqueous solution is used as fuel. FIG. 2A is a block diagram schematically showing the structure of the fuel cell system, and FIG. 2B is a schematic cross-sectional view showing a principle of an electromotive unit of the fuel cell.

In the fuel cell system 11 of FIG. 2A, the fuel cartridge 3 is provided in which it can be attached to and detached from the fuel cell 2 (main body). In the fuel cartridge 3 serving as the fuel reservoir, a high-concentrated methanol raw fuel becoming electromotive fuel is filled, and the high-concentrated methanol raw fuel is sucked by a fuel cell pump 12, if necessary, and is delivered to a mixture tank 13. In addition, the methanol raw fuel is mixed with water in the mixture tank 13 and water recovered by a pump 15 from a power generating stack 14, and becomes a methanol aqueous solution having a predetermined concentration used in the fuel cell 2. In addition, in the stack 14, electricity is generated by the methanol aqueous solution which is the liquid fuel, and air (oxygen) supplied by a pump 16. Here, the stack 14 has a structure in with a plurality of cells each composed of an anode electrode 18 and a cathode electrode 19 with an electrolyte film 17 interposed therebetween are laminated, as shown in FIG. 2B.

In addition, the fuel cell system 11 has a structure in which devices of the above-mentioned control system, and a known piping system, an exhaust system, and a warning device are disposed on the basic structure.

Figure 3A:
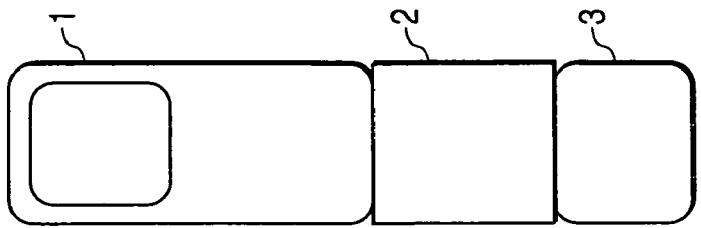
FIGS. 3A to 3C are schematic diagrams illustrating a method of mounting the fuel cell and a fuel reservoir to a communication terminal.
Figure 3B:
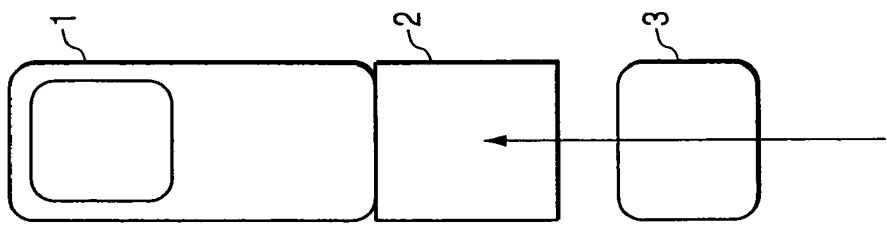
Figure 3C:
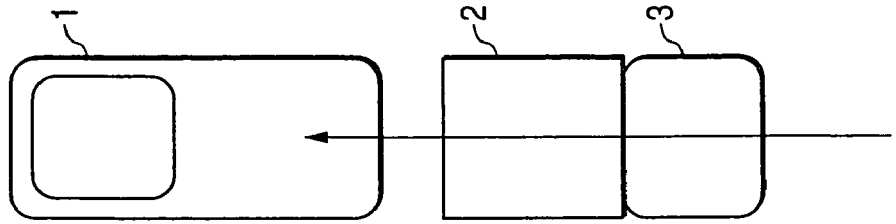

Next, FIGS. 3A to 3C shows a method of mounting the fuel cell 2 and the fuel cartridge 3, which are freely attachable and detachable, in the cellular phone 1. FIG. 3A shows a case in which after the fuel cell 2 and the fuel cartridge 3 are connected to each other, they are mounted in the cellular phone 1. FIG. 3B shows a case in which after the fuel cell 2 is mounted in the cellular phone 1, the fuel cartridge 3 is connected to the fuel cell 2. In this way, as shown in FIG. 3C, the fuel cell 2 and the fuel cartridge 3 are mounted in the cellular phone 1 which is a communication terminal.

Next, an operation sequence of the cellular phone 1 using the above-mentioned fuel cell will be described based on a specific example.

FIGS. 4A and 4B are flowcharts of an operations sequence when watching a TV program. Here, contents other than the TV program may be possible.

(Case of Driving Fuel Cell After Watching TV Program)

As shown in FIG. 4A, in step S1, a power supply of the fuel cell 2 is turned on. In step S2, the ID detecting unit 5 of the cellular phone 1 detects an ID of the fuel cell 2 to specify a fuel cell ID (A). In the same manner, in step S3, the ID detecting unit 5 detects an ID of the fuel cartridge 3 to specify a cartridge ID (B).

After that, in step S4, a TV switch of the cellular phone 1 is turned on. Next, in step S5, the content detecting unit 4 detects a TV watching program becoming used contents to specify a watching program (C). Next, in step S6, the driving state of the fuel cell is set to an on state to drive the fuel cell 2. Next, in step S7, the cell operating state detecting unit 6 detects the operation time, the output, and the amount of consumed fuel which are the operation situations of the fuel cell 2 to specify a driving state (D).

Next, in step S8, the detection value matching unit 7 collates the detection value data detected by performing the specifications (A) to (D), associates them with each other, and stores them. In addition, the detecting value matching unit 7 performs an operation process on an amount of raw fuel consumed when the cellular phone is driven in order to execute the various contents, calculates the amount of consumed raw fuel, and stores it as electronic data. Next, in step S9, the electronic data is transmitted to the content provider and the fuel reservoir manufacturer through the cellular phone 1. Alternatively, the electronic data is transmitted to a specific location (server) determined by the communication carrier.

Here, if the transmission data is encrypted, it is very suitable for keeping individual information of the user in a confidential state.

(Case of Watching TV Program After Driving Fuel Cell)

As shown in FIG. 4B, in step S1, a power supply of the fuel cell 2 is turned on. In step S12, the ID detecting unit 5 of the cellular phone 1 detects an ID of the fuel cell 2 to specify a fuel cell ID (A). In the same manner, in step S13, the ID detecting unit 5 detects an ID of the fuel cartridge 3 to specify a cartridge ID (B).

After that, in step S14, the driving state of the fuel cell is set to an on state to drive the fuel cell 2. Next, in step S15, a TV switch of the cellular phone 1 is turned on. Next, in step S16, the content detecting unit 4 detects a TV watching program becoming used contents to specify a watching program (C). Next, in step S17, a driving state is specified (D).

Next, in step S18, the detection value matching unit 7 collates the detection value data detected by performing the specifications (A) to (D), associates them with each other, and stores the created electronic data. Next, in step S19, the electronic data is transmitted to a specific server determined by the communication carrier so as to be stored therein.

Through the process in accordance with the above-mentioned operation sequence, the TV programs watched through the cellular phone 1 can be associated with the amount of the consumed fuel of the fuel cell 2 and the amount of the consumed fuel of the fuel cartridge 3 used for supplying a power to the cellular phone 1 at the time of watching the TV programs.

Here, a method of specifying the TV program is implemented through a tuner and a channel changing signal. Further, examples of the specification method may include a method of performing pattern matching for reproduced images and sounds (a method used for TV-rating research) or a method of selecting programs from an electronic program table connected through the internet. Even though any method is used, the association gives an advantage to the user differently from general TV-rating research. Therefore, even though the operation is slightly complicated, it is possible to suitably specify the TV program through the association.

On the other hand, when the user connects the site through the internet, since the user passes through a communication gateway, the specification can be easier. If metadata capable of specifying the contents is embedded in the contents themselves, specifying the contents such as watching programs, can be very easy. The content detecting unit 4 obtains information related to the communication gateway or the metadata to specify the programs to watch.

The IDs of the fuel cell 2 and the fuel cartridge 3 are stored in the respective memory units included in the fuel cell 2 and the fuel cartridge 3, and are specified by performing reading through each I/F. Since the unique ID of the cellular phone 1 is specified at the time of communication, it is excluded. However, the association data that the unique ID of the cellular phone 1 is also included is possible.

The driving state of the fuel cell 2 may be determined from integrated information of the solution supplied from the fuel cell 2 to the anode electrode, air supplied to the cathode electrode, and whether the fuel cartridge 3 is connected or not connected, and may be determined by detecting whether a current flows into a power supply path. As described above, it is preferable that the cell operating state monitoring unit 8 be provided at the fuel cell 2 side.

Figure 5:
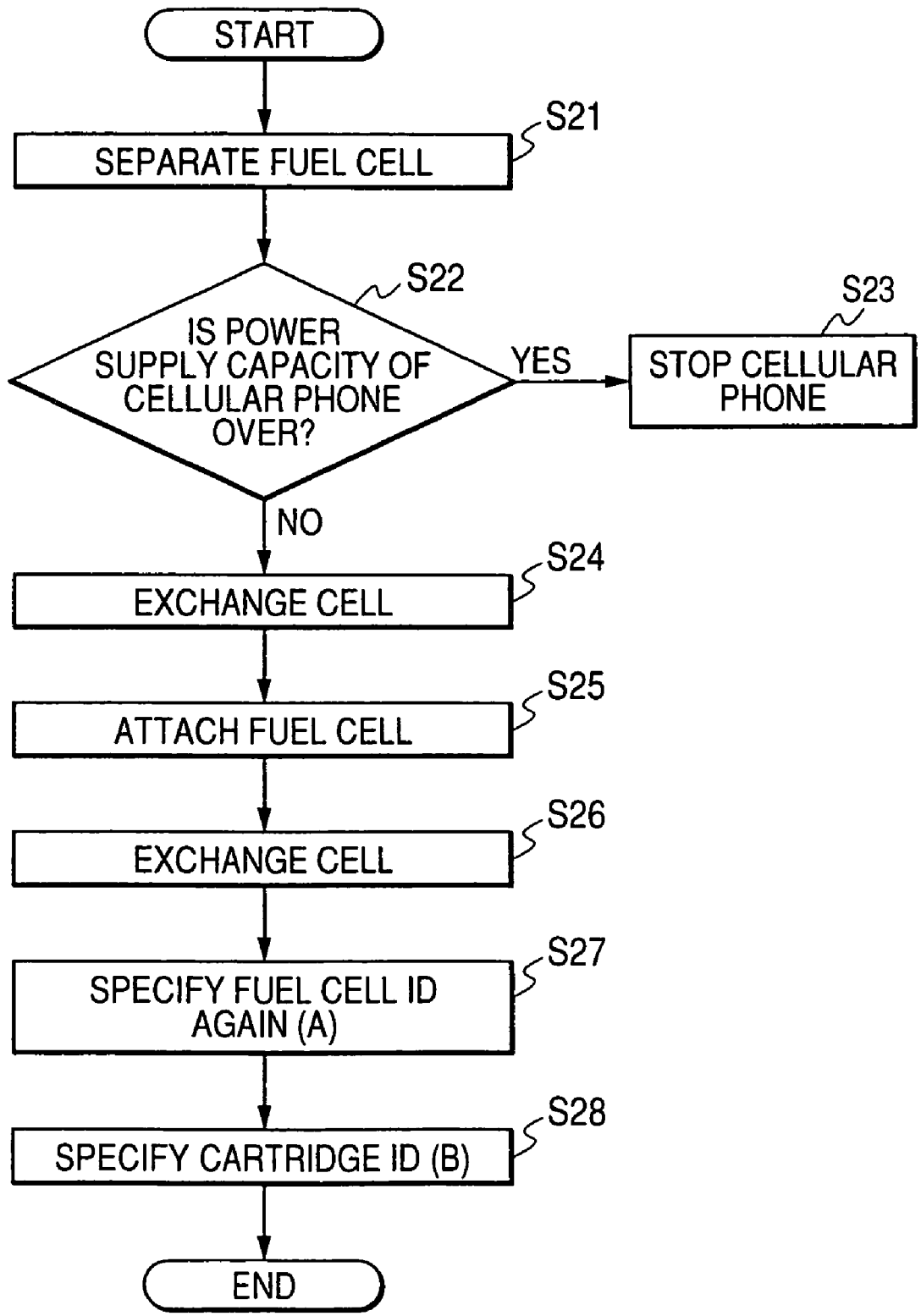
FIG. 5 is a flowchart illustrating the operation of the communication terminal and the power supply management system of the fuel cell.

Next, during the operation of the cellar phone 1, in a case in which the fuel cell is exchanged, an operation sequence will be described with reference to a flowchart showing a partial process flow of FIG. 5.

In step S21, the fuel cell 2 connected to the fuel cartridge 3 is separated from the cellular phone 1. Next, in step S22, a residual power supply capacity of the storage cell built in the cellular phone 1 is checked. When the power is insufficient from the power supply, that is, when the power supply capacity is over, the operation of the cellular phone 1 is stopped in step S23. Here, when the power supply capacity is not over, the exchanging operation of the storage cell is performed in step S24. Next, in step S25, a new fuel cell is attached, and in step S26, the exchanging operation of the new fuel cell is performed.

Next, in step S27, the ID detecting unit 5 of the cellular phone 1 detects an ID of the new fuel cell 2 to specify a fuel cell ID (A). In the same manner, in step S28, the ID detecting unit 5 detects the ID of the fuel cartridge 3 again to specify the cartridge ID (B). Next, contents such as TV programs are watched through the operation illustrated in FIGS. 4A and 4B.

Figure 6:
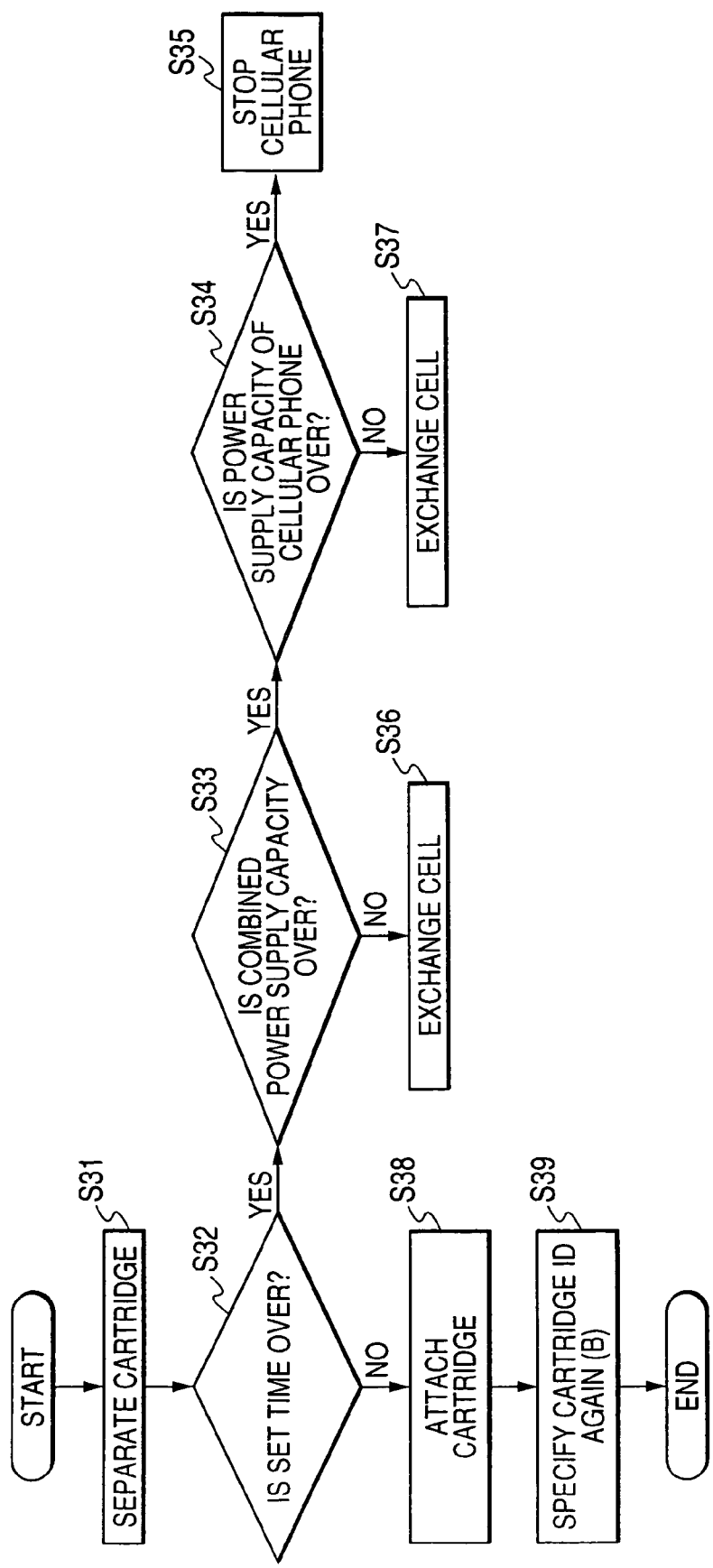
FIG. 6 is a flowchart illustrating the operation of the communication terminal and the power supply management system of the fuel cell.

Next, during the operation of the cellular phone 1, in a case in which the fuel cartridge 3 is exchanged, an operation sequence will be described with reference to a flowchart of a partial process flow of FIG. 6.

In step S31, the fuel cartridge 3 is separated from the fuel cell 2 attached to the cellular phone 1. Next, in step S32, if a predetermined time is over for which the fuel cartridge 3 can be driven in a state in which the fuel cartridge 3 is separated, when another external power supply used together with it exists, it is confirmed whether a drivable capacity remains in step S33. Here, when another external power supply used together with it does not exist or when the capacity is over such that the fuel cartridge 3 can not be driven, a residual power supply capacity of the storage cell built in the cellular phone 1 is checked in step S34. Next, when the power supply capacity is over, the operation of the cellular phone 1 is stopped in step S35. In the step S33, when the capacity of another external power supply used together with it is not over, the exchanging operation of the cell is performed in step S36. In addition, in the step S34, the power supply capacity of the cellular phone is not over, the cell is exchanged in step S37.

In addition, in step S32, within the time when the set time is not over, the process enters into step S38, so that a new fuel cartridge is connected to the fuel cell 2 to be attached. Next, in step S39, the ID detecting unit 5 of the cellular phone 1 detects an ID of the new fuel cartridge 3 to specify a fuel cartridge ID (B). In addition, contents such as TV programs are watched through the operation illustrated in FIGS. 4A and 4B.

The set time in the step S32 is set to a time for which the fuel cell 2 can be operated even though the fuel cartridge 3 is separated. In addition, if the fuel cartridge 3 is exchanged within the set time, the continuous operation can be performed without stopping the fuel cell 2 or the cellular phone 1.

Next, an operation sequence of a case in which the TV channel is changed and the registration of a specifically designated TV program exists will be described with reference to a flowchart of FIGS. 7A and 7B.

(Case of Changing Channel)

As shown in FIG. 7A, in step S41, the channel is changed using the channel changing signal and the tuner of the cellular phone 1. Next, in step S42, the content detecting unit 4 of the cellular phone 1 detects a TV watching program becoming newly used contents to specify a watching program (C). Next, contents of a new watching program are watched through the operation illustrated in FIGS. 4A and 4B.

(Case of Registering Designated Program)

As shown in FIG. 7B, in step S51, a power supply of the fuel cell 2 is turned on. In step S52, the ID detecting unit 5 of the cellular phone 1 detects an ID of the fuel cell 2 to specify a fuel cell ID (A). In the same manner, in step S53, the ID detecting unit 5 of the cellular phone 1 detects an ID of the fuel cartridge 3 to specify a cartridge ID (B). After that, in step S54, a TV switch of the cellular phone 1 is turned on. Next, in step S55, information reading is performed on the designated program. Next, in step S56, the content detecting unit 4 detects a watching program based on the designated program information to specify the watching program (C). After that, the following processes are performed in the same manner as the processes subsequent to the step S6 of FIG. 4A. That is, in step S57, the driving state of the fuel cell is set to an on state to drive the fuel cell 2. Next, in step S58, the cell operating state detecting unit 6 specifies a driving state (D).

Next, in step S59, the detection value matching unit 7 collates the detection value data detected by performing the specifications (A) to (D), associates them with each other, and stores them. In addition, in step S60, the electronic data illustrated in FIGS. 4A and 4B is transmitted to the content provider and the fuel reservoir manufacturer. Alternatively, the electronic data is transmitted to a server of a terminal management system to be stored therein.

When the designated program is registered, the operation sequence is basically the same as the operation sequence illustrated in FIGS. 4A and 4B. However, when the specific program (channel) exists, it is not necessary that the information be read and it be collated that the reproduced program is the corresponding program. In addition, the information of the specific program may be downloaded at the time of collating, and it is more preferable that the information of the specific program be stored in advance.

Next, an operation sequence of a case in which the driving of the fuel cell 2 is temporarily stopped will be described with reference to a flowchart of FIG. 8. Here, when the driving of the fuel cell 2 is stopped, it is necessary that the driving state be set again.

In step S61, it is confirmed whether another external power supply used together with it has a drivable capacity. Here, when the capacity of another external power supply used together with it is not over, the process enters in step S62. In addition, when another external power supply does not exist or when the capacity of another external power supply is over, the process enters in step S63. In the step S63, a residual power supply capacity of the storage cell built in the cellular phone 1 is checked. Next, when the power supply capacity is not over, the process enters in step S62.

In the step S62, the operation of the fuel cell 2 is stopped. Next, in step S64, the cell exchanging operation is performed. Next, in step S65, the cell operating state detecting unit 6 of the cellular phone 1 specifies the driving state of the fuel cell 2 (D). Next, in step S66, the fuel cell 2 is driven again. If so, in step S67, the cell exchanging operation is performed again. In step S68, the cell operating state detecting unit 6 of the cellular phone 1 specifies the driving state of the fuel cell 2 again (D).

In addition, in the step S63, a residual power supply capacity of the storage cell built in the cellular phone 1 is checked. If the power supply capacity of the storage cell is over, the process enters in step S69 or step S70, so that the operation is continuously performed or the cellular phone is stopped.

In the above-mentioned description, when the fuel cell 2 or the fuel cartridge 3 is separated, the flowchart of the process sequence in the case in which the operation is stopped is illustrated. However, this is only the description related to the association process in the detection value matching unit 7. For this reason, in the above-mentioned description, the stable operation of the various elements or the detailed flow for performing the stable operation is omitted. In addition, it is needless to say that the flowchart of the process sequence used in the above-mentioned description is only an example.

Next, it is preferable that there be a system in which when the electronic data obtained by collating information of the specifications (A) to (D) and associating them with each other is transmitted in the steps S9 and S19 of FIGS. 4A and 4B, the transmission data from each user can be collectively received in the specific server determined by the communication carrier. A simple process sequence of the terminal management system receiving the transmission data in this case will be described with reference to a flowchart of FIG. 9.

In step S71, if the electronic data created by collating the information data of each user such as the information of the specifications (A) to (D) and associating them with each other is received, individual identification information, which has been previously registered for each user, is collated in step S72. Next, in step S73, this information data is added, and is then stored in the storage unit of the system.

Thereby, the commonly associated electronic data is stored in the communication terminal side, the terminal management system side or the content supply side. The terminal management system side and the content supply side can apprehended the contents which the unspecific user executes using the fuel cartridge 3 and the fuel cell 2 having any IDs, based on the electronic data. In addition, the content supply side can have access to the information through the terminal management system.

In addition, although not shown, when the fuel cartridge 3 which is a new fuel reservoir is purchased by a user through a selling system in which contents can be apprehended by the terminal management system, the purchasing information of the fuel reservoir is added in the associated electronic data. The content supply side and the communication terminal side can have access to the added electronic data.

In this way, when the user purchases the new fuel cartridge through the selling system, some of the purchasing cost is automatically charged with respect to the content supply side under a predetermined condition based the associated electronic data.

According to the first embodiment, in the communication terminal or the power supply management system thereof in which a power is supplied through the fuel cell, the execution of the various contents becoming the subject of the power consumption and the amount of the consumed fuel in the fuel cell or the fuel reservoir used in the communication terminal can be uniquely associated.

In addition, when the user purchases the new fuel cartridge, it is possible to very simply perform services such as the share of the cost of the fuel reservoir and the division of the profit under a predetermined contract. In addition, the fuel cell, which is a portable power supply or a transportable power supply, and the fuel reservoir thereof may be widely used.

Second Embodiment

Figure 10:
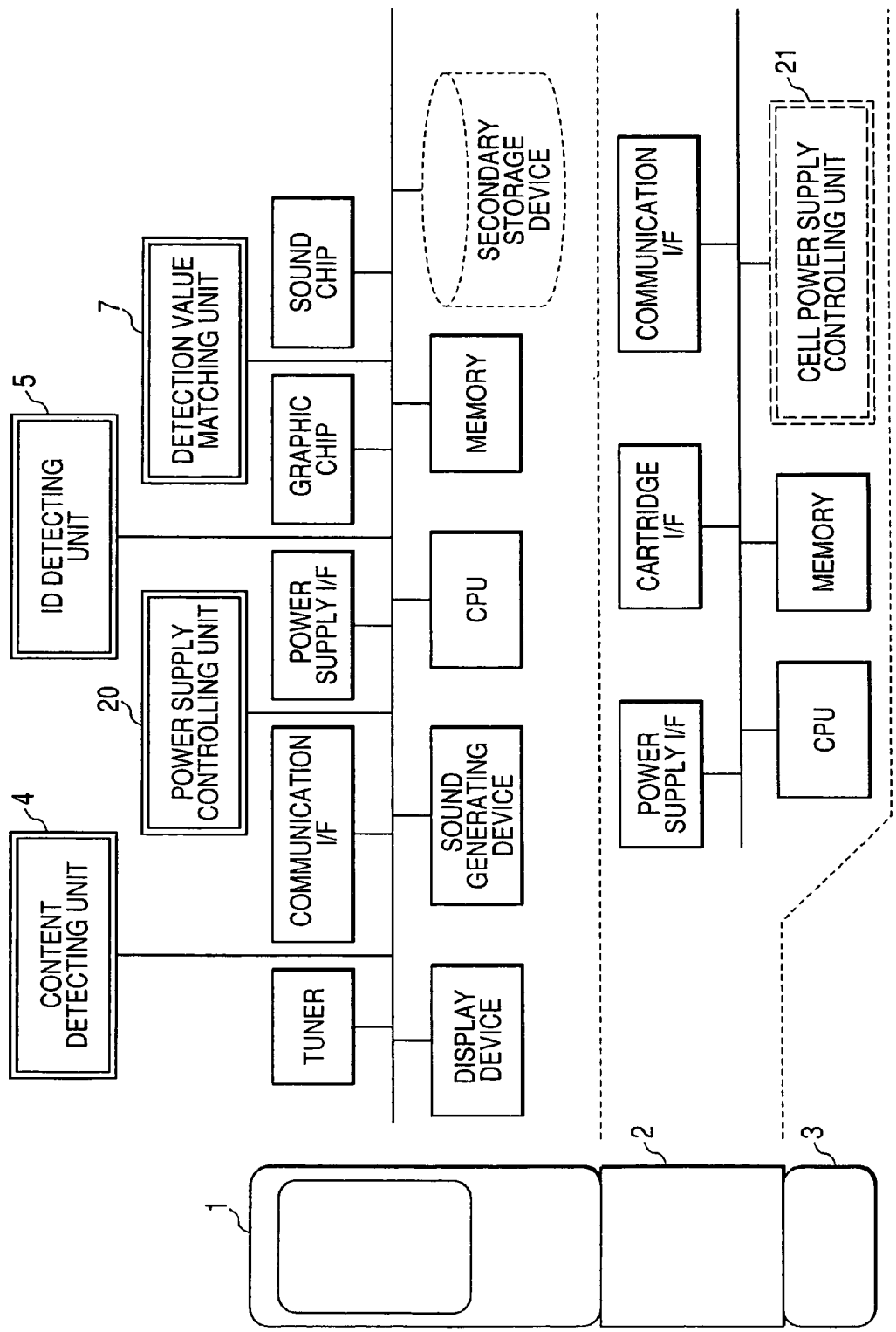
FIG. 10 is a block diagram schematically showing a structure of a communication terminal and a power supply management system of a fuel cell according to a second embodiment of the invention.
Figure 11A:
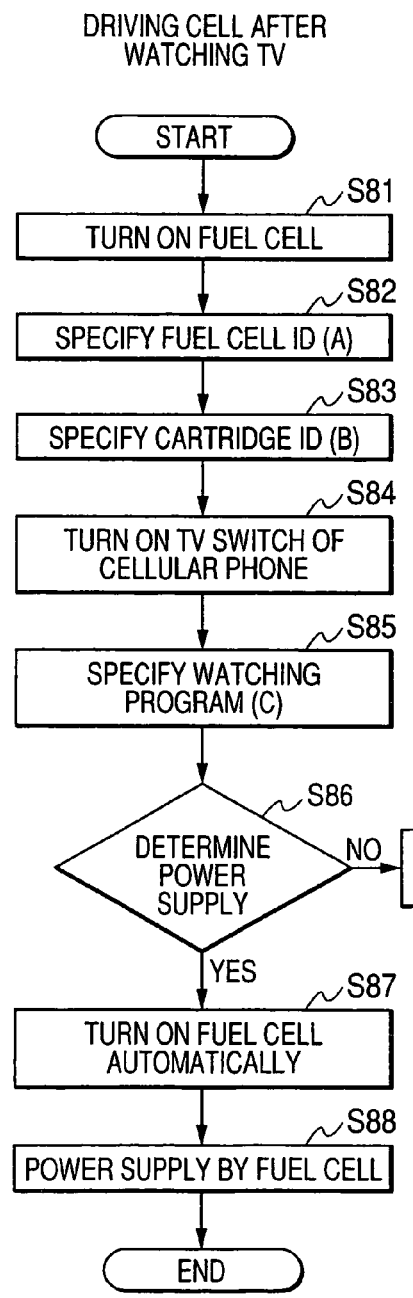
FIGS. 11A and 11B are flowcharts illustrating the operation of the communication terminal and the power supply management system of the fuel cell according to the second embodiment of the invention.
Figure 11B:
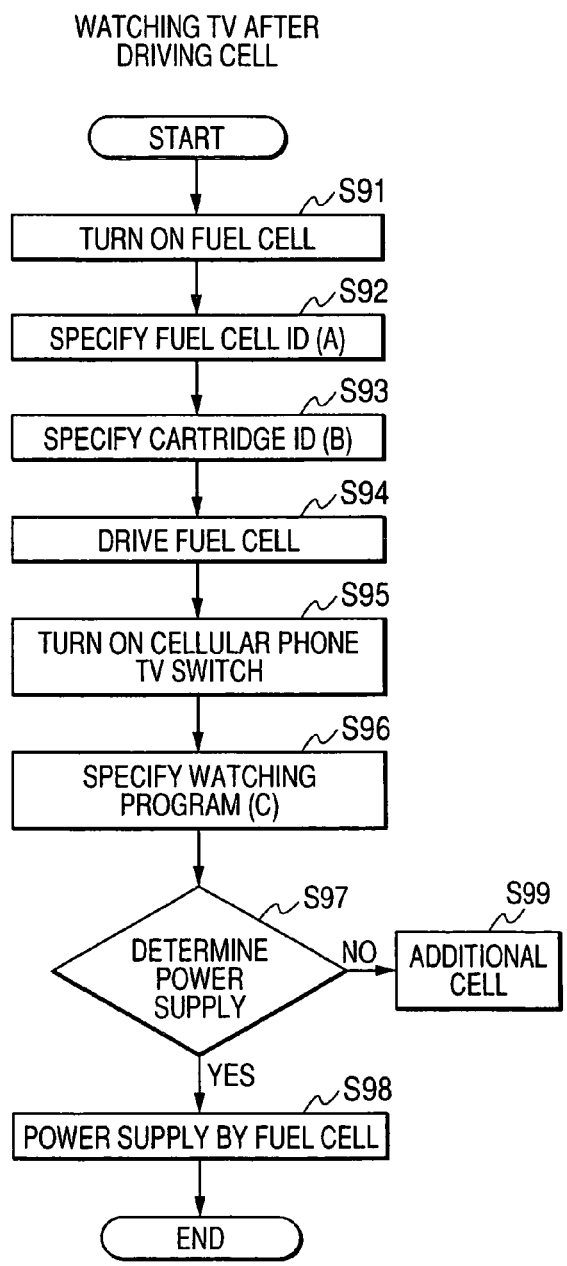

Next, a second embodiment of the invention will be described with reference to FIGS. 10, 11A, and 11B. FIG. 10 is a block diagram schematically showing a structure of a communication terminal and a simplified power supply management system thereof according to the second embodiment of the invention. FIGS. 11A and 11B are flowcharts illustrating an operation sequence of the system when watching a TV program as used contents.

According to the present embodiment, in the execution of the specific contents, a power supply can be automatically changed from the storage cell built in the communication terminal to the fuel cell. Also in the present embodiment, the cellular phone is used as the communication terminal.

As shown in FIG. 10, a cellular phone 1 or a power supply management system thereof includes a content detecting unit 4, an ID detecting unit 5, a detection value matching unit 7 that associates detected information with each other and integrates them, and a power supply controlling unit 20 that changes a power supply path in the fuel cell 2.

Here, the content detecting unit 4, the ID detecting unit 5, and the detection value matching unit 7 are the same as those of the first embodiment described above. In addition, in the execution of the contents, the power supply controlling unit 20 changes a power supply used for driving the cellular phone 1 from the storage cell to the fuel cell 2 based on the collation result of the detection value matching unit 7. Alternatively, it functions as a power supply controlling unit that performs the operation opposite to the above-mentioned description.

Here, it is preferable that the fuel cell 2 has a cell power supply controlling unit 21 corresponding to the above-mentioned power supply controlling unit 20. The other structure is the same as that of the first embodiment in the cellular phone 1, the fuel cell 2, and the fuel cartridge 3.

Next, an operation sequence of the cellular phone 1, which uses the fuel cell according to the second embodiment, will be described with reference to specific examples illustrated in FIGS. 11A and 11B. FIGS. 11A and 11B are flowcharts illustrating an operation sequence when watching a TV program, but the operation sequence can be applied to contents other than the TV program in the same manner as the TV program.

(Case of Driving Fuel Cell After Watching TV Program)

As shown in FIG. 11A, in step S81, a power supply of the fuel cell 2 is turned on. In step S82, the ID detecting unit 5 of the cellular phone 1 detects an ID of the fuel cell 2 to specify a fuel cell ID (A). In the same manner, in step S83, the ID detecting unit 5 of the cellular phone 1 detects an ID of the fuel cartridge 3 to specify a cartridge ID (B).

After that, in step S84, a TV switch of the cellular phone 1 is turned on. Next, in step S85, the content detecting unit 4 detects a TV watching program becoming used contents to specify a watching program (C).

Next, in step S86, the power supply controlling unit 20 determines whether the watching program corresponds to the specific contents and determines the power supply. In the process of determining the power supply, when the watching program becomes contents specified by a user in advance, a driving state of the fuel cell is automatically set to an on state in step S87. In step S88, a power is supplied to the cellular phone 1 from the fuel cell 2.

In the step S86, when the watching program does not correspond to the specific contents, the cellular phone 1 is supplied with a power from a separate cell, that is, a built-in storage cell in step S89.

In addition, although not shown, in a case in which the cellular phone 1 has the detection value matching unit 7, similarly to the first embodiment, when executing contents other than the specific contents which changes the power supply, the usage of the fuel cell and the execution of the contents can be also associated with each other. In addition, the detecting value matching unit 7 performs an operation process on an amount of fuel and an amount of raw fuel consumed when the cellular phone is driven in order to execute the various contents, calculates the amount of consumed fuel and the amount of consumed raw fuel, and stores them as electronic data. After that, the various electronic data is transmitted to the content provider and the fuel reservoir manufacturer through the cellular phone 1. Alternatively, the electronic data is transmitted to a specific server determined by the communication carrier and is then stored therein.

(Case of Watching TV Program After Driving Fuel Cell)

As shown in FIG. 11B, in step S91, a power supply of the fuel cell 2 is turned on. In step S92, the ID detecting unit 5 of the cellular phone 1 detects an ID of the fuel cell 2 to specify a fuel cell ID (A). In the same manner, in step S93, the ID detecting unit 5 of the cellular phone 1 detects an ID of the fuel cartridge 3 to specify a cartridge ID (B).

After that, in step S94, the driving state of the fuel cell is set to an on state to drive the fuel cell 2. Next, in step S95, a TV switch of the cellular phone 1 is turned on. In step S96, the content detecting unit 4 detects a TV watching program becoming used contents to specify a watching program (C).

Next, in step S97, the power supply controlling unit 20 determines whether the watching program corresponds to the specific contents and determines the power supply. In the process of determining the power supply, when the watching program becomes contents specified by a user in advance, the cellular phone 1 is supplied with a power from the fuel cell 2 in step S98.

Hereinafter, although not shown, when executing contents other than the specific contents which changes the power supply, the detection value matching unit 7 associates the usage of the fuel cell with the execution of the contents. In addition, the created electronic data is transmitted to the server of the terminal management system and is then stored therein.

In the step S97, when the watching program does not correspond to the specific contents, in step S99, the cellular phone 1 is supplied with a power from a separate cell, that is, a built-in storage cell.

If a user watches a specific program (channel) through the cellular phone 1, the power supply management system makes the cellular phone 1 automatically supplied with a power from the fuel cell 2. In the case of a radio and the internet, the power can be automatically supplied in the same manner. In addition, if contents in which the above-mentioned metadata is embedded are reproduced, even though the contents are input through an external storage unit, it is possible to easily cope with it. In this case, the same effects as the above-mentioned first embodiment can be obtained.

Third Embodiment

Figure 12:
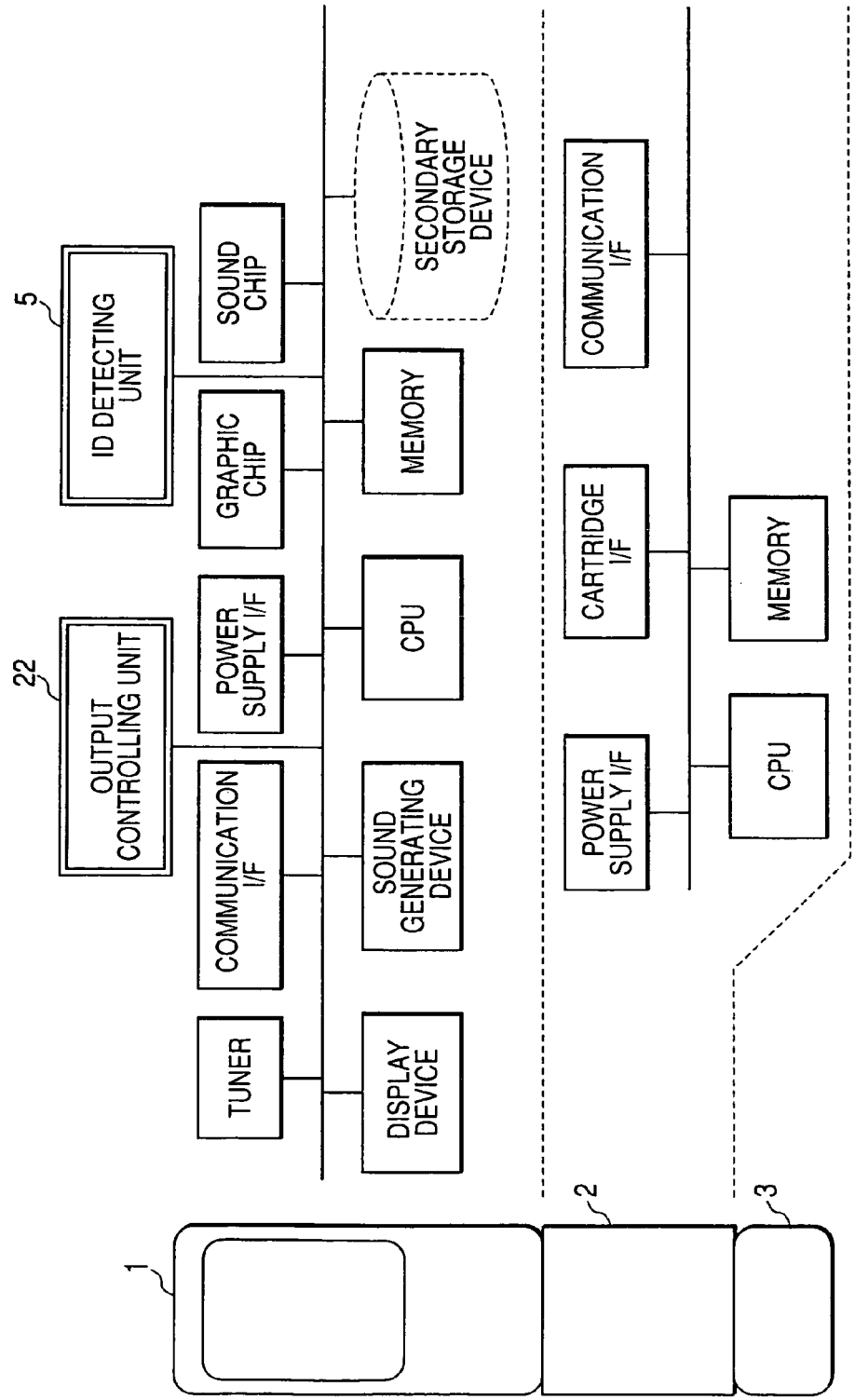
FIG. 12 is a block diagram schematically showing a structure of a communication terminal and a power supply management system of a fuel cell according to a third embodiment of the invention.
Figure 13:
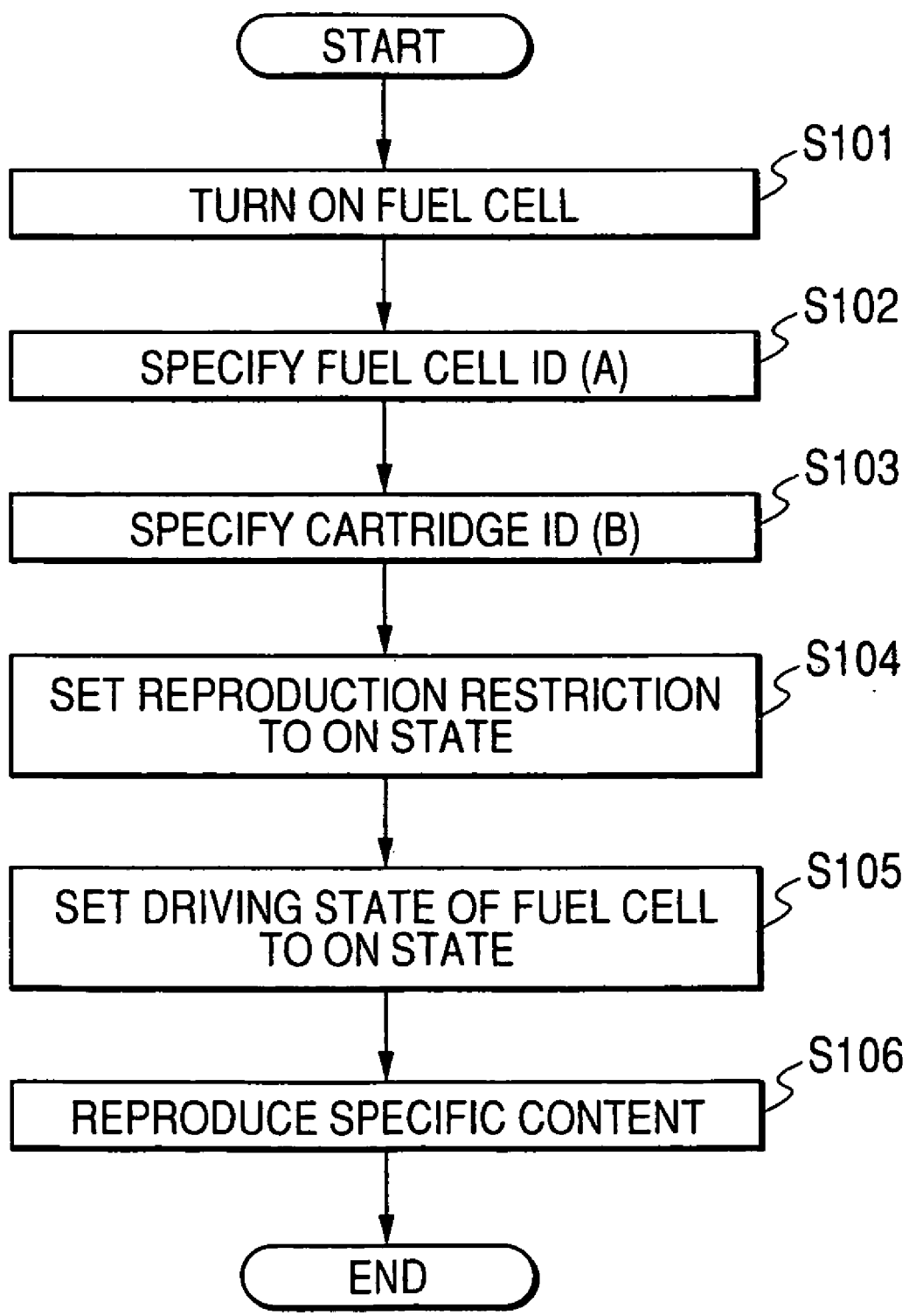
FIG. 13 is a flowchart illustrating the operation of the communication terminal and the power supply management system of the fuel cell according to the third embodiment of the invention.

Next, a third embodiment of the invention will be described with reference to FIGS. 12 and 13. FIG. 12 is a block diagram schematically showing a structure of a communication terminal and a simplified power supply management system thereof according to the third embodiment of the invention. FIG. 13 is a flowchart illustrating the operation sequence of the power supply management system.

According to the third embodiment, when a power is supplied from the fuel cell, reproduction restriction of specific contents is automatically released, so that the specific contents are executed. In the third embodiment described below, a cellular phone is used as the communication terminal.

As shown in FIG. 12, a cellular phone 1 or a power supply management system thereof includes an ID detecting unit 5, and an output controlling unit 22 that automatically releases reproduction restriction of specific contents to output the contents when the specific contents are received by the cellular phone 1.

Here, when the power is supplied from the fuel cell 2, if a user receives predetermined specific contents, the output controlling unit 22 releases the reproduction restriction of the specific contents automatically.

The ID detecting unit 5 is the same as that described in the first embodiment. In addition, as in the first embodiment, the cellular phone 1 may have a detection value matching unit 7 or may have a cell operating state detecting unit 6. The other structure of the third embodiment may be the same as that of the first embodiment in the cellular phone 1, the fuel cell 2, and the fuel cartridge 3.

If the specific contents are executed, the output controlling unit 22 may collate the information such as the IDs and the specific contents, associate them with each other, and store them as electronic data. In addition, the electronic data may be transmitted to a content provider and a fuel reservoir manufacturer through a cellular phone 1.

Next, an operation sequence of the cellular phone 1 using the fuel cell according to the third embodiment will be described with reference to a specific example illustrated in FIG. 13.

As shown in FIG. 13, in step S101, a power supply of the fuel cell 2 is turned on. In step S102, the ID detecting unit 5 of the cellular phone 1 detects an ID of the fuel cell 2 to specify a fuel cell ID (A). In the same manner, in step S103, the ID detecting unit 5 of the cellular phone 1 detects an ID of the fuel cartridge 3 to specify a cartridge ID (B).

After that, in step S104, the reproduction restriction of the contents is set to an on state. Thereby, if the specific contents are received, the output controlling unit 22 automatically releases the reproduction restriction of the contents. Next, in step S105, the driving state of the fuel cell is set to an on state to drive the fuel cell 2. Next, in step S106, the specific contents can be executed. Although not shown, the following processes are the same as those of the first and second embodiments.

By means of the power supply management system, in the case in which the fuel cell 2 is connected and the specific contents are executed, the information such as the IDs, the contents, the amount of the consumed fuel, the operation situation of the fuel cell at the time of executing the contents or the like are collated, are associated with each other and are stored as the electronic data. Also in this case, the same effect as the first embodiment can be obtained.

Fourth Embodiment

Figure 14:
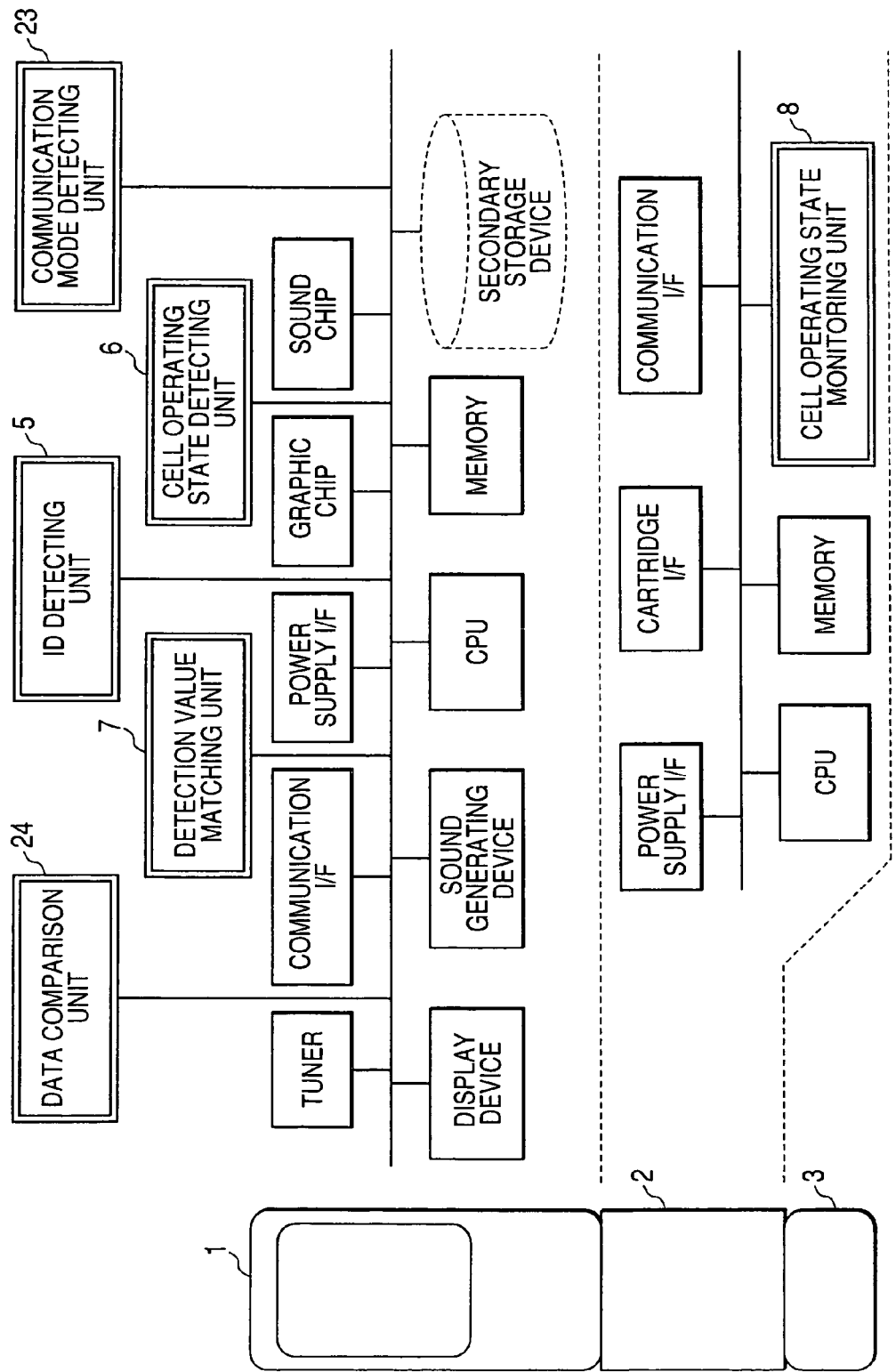
FIG. 14 is a block diagram illustrating a structure of the communication terminal and the power supply management system of the fuel cell according to a fourth embodiment of the invention.
Figure 15:
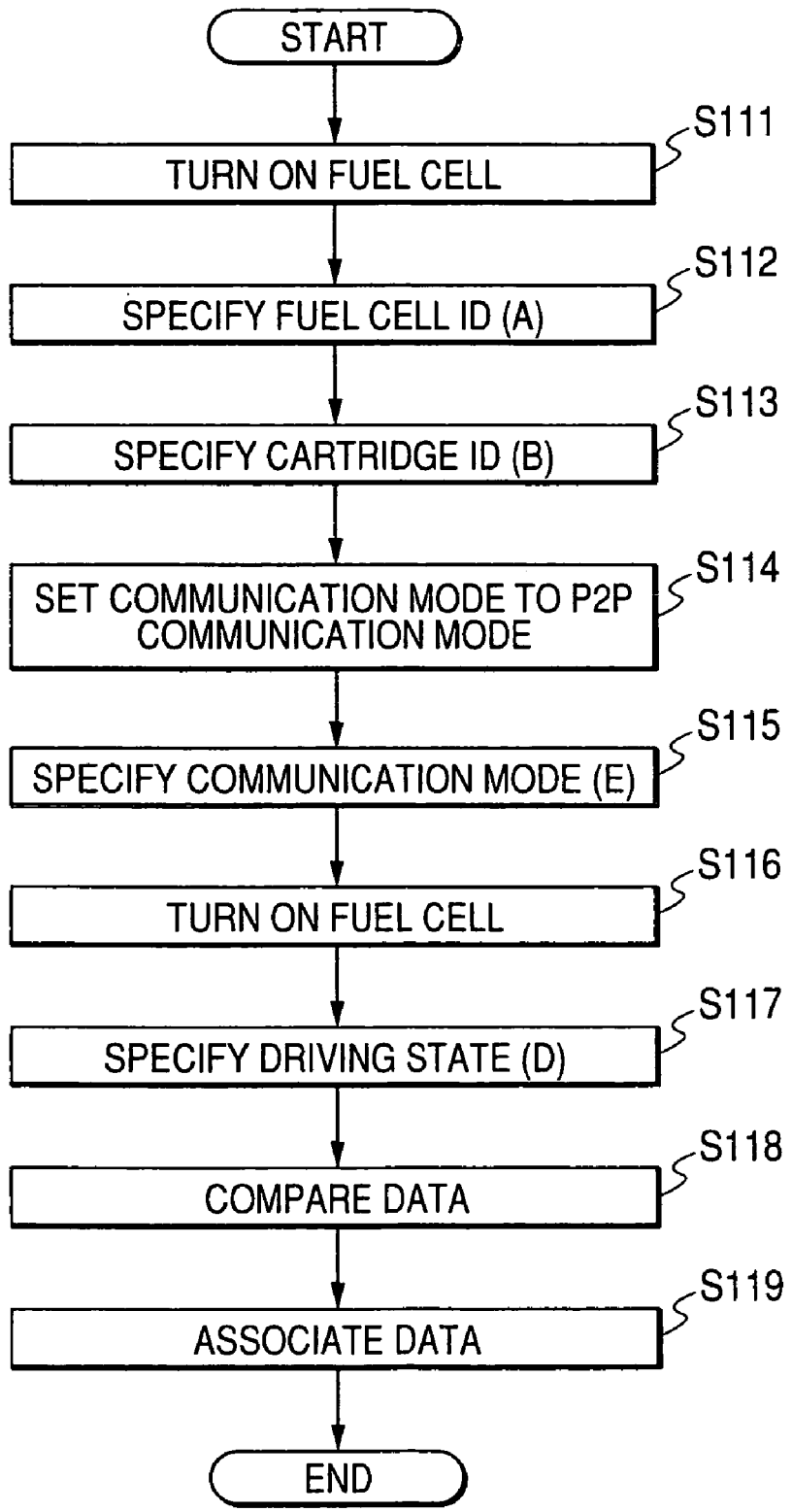
FIG. 15 is a flowchart illustrating the operation of a communication terminal and a power supply management system of a fuel cell according the fourth embodiment of the invention.

Next, a fourth embodiment of the invention will be described with reference to FIGS. 14 and 15. FIG. 14 is a block diagram schematically showing a structure of a communication terminal and a simplified power supply management system thereof according to the fourth embodiment of the invention. FIG. 15 is a flowchart illustrating the operation of the power supply management system.

The fourth embodiment is constructed such that it can cope with a communication terminal for performing P2P communication. In the fourth embodiment described below, a cellular phone is used as the communication terminal.

As shown in FIG. 14, a cellular phone 1 or a power supply management system thereof includes an ID detecting unit 5, a cell operating state detecting unit 6, a detection value matching unit 7, a communication mode detecting unit 23 that specifies a communication mode of the cellular phone, and a data comparison unit 24 that compares transmission/reception/transfer data at the time of P2P communication.

Here, the communication mode detecting unit 23 detects whether a communication mode is the P2P communication mode at the time of driving the communication terminal, and the data comparison unit 24 compares an amount of data that a user actively transmits/receives at the time of the detected P2P communication with an amount of data that another user serving as one node constituting the P2P system transmits data which another user transmits and receives.

In addition, the ID detecting unit 5, the cell operating state detecting unit 6, and the detection value matching unit 7 are the same as those illustrated in the first embodiment. In addition, the structure of the fuel cell 2 and the fuel cartridge 3 is also the same as that of the first embodiment.

Next, an operation sequence of the cellular phone 1 using the fuel cell according to the fourth embodiment will be described with reference to specific examples illustrated in FIG. 15.

As shown in FIG. 15, in step S111, a power supply of the fuel cell 2 is turned on. In step S112, the ID detecting unit 5 of the cellular phone 1 detects an ID of the fuel cell 2 to specify a fuel cell ID (A). In the same manner, in step S113, the ID detecting unit 5 of the cellular phone 1 detects an ID of the fuel cartridge 3 to specify a cartridge ID (B).

After that, in step S114, a communication mode is set to the P2P communication mode. Next, in step S115, the communication mode detecting unit 23 confirms whether the communication mode is the P2P communication mode. Next, in step S116, the driving state of the fuel cell is set to an on state to drive the fuel cell 2. Next, in step S117, the cell operating state detecting unit 6 detects an operation time, an output and an amount of consumed fuel which are operation situations of the fuel cell 2, and specifies a driving state (D).

Next, in step S118, the data comparison unit 24 compares and collates an amount of data that a user of the P2P communication actively transmits with an amount of data that another user serving as one node constituting the P2P system transmits data which another user transmits and receives. Next, in step S119, the detection value matching unit 7 collates the detection value data of the specifications (A), (B), (D), and (E) with the data of the compared and collated result, associates them with each other, and stores them. In addition, an operation process is performed on the amount of consumed fuel or the amount of consumed raw fuel used at the time of driving the cellular phone based on the detection value data, and the amount of consumed fuel or the amount of consumed raw fuel is calculated and is stored as the electronic data. After that, although not shown, similarly to the first embodiment, the respective data are transmitted to a specific server determined by a communication carrier or a cartridge company through the cellular phone 1 and are then stored.

In a case in which the fuel cell 2 is connected to the cellular phone 1 and the P2P communication is performed, it is possible to estimate the consumed power which is used (used by the communication terminal 1 serving as the transmission node that another user transmits and receives data). In this case, it is possible to newly allocate an expense for the cartridge between P2P users.

Fifth Embodiment

Next, a fifth embodiment of the invention will be described with reference to FIGS. 16, 17A, and 17B. FIG. 16 is a block diagram schematically showing a structure of a communication terminal and a simplified power supply management system thereof according to the fifth embodiment of the invention. FIG. 16 is a flowchart illustrating the operation sequence of the power supply management system.

The fifth embodiment is constructed such that a power supply can be automatically changed from a storage cell built in a communication terminal to a fuel cell at the time of P2P communication. In the fifth embodiment described below, a cellular phone is used as the communication terminal.

As shown in FIG. 16, a cellular phone 1 or a power supply management system thereof includes an ID detecting unit 5, a detection value matching unit 7, a power supply controlling unit 20, and a communication mode detecting unit 23.

Here, the communication mode detecting unit 23 detects whether a communication mode is the P2P communication mode at the time of driving the communication terminal. In addition, if the cellar phone 1 enters in a P2P communication mode, the power supply controlling unit 20 changes a power supply used at the time of driving the cellar phone 1 from the storage cell to the fuel cell 2.

The ID detecting unit 5 is the same as that illustrated in the first embodiment. In addition, the detection value matching unit 7 collates detection value data from the ID detecting unit 5, the communication mode detecting unit 23 or the like. In addition, the collated data may be transmitted to the power supply controlling unit 20. In addition, the detection value matching unit 7 may collate the detection value data, associate them with each other, and store them. In addition, the detection value matching unit 7 may perform an operation process on the amount of fuel or the amount of raw fuel consumed at the time of driving the cellular phone, and calculate the amount of consumed fuel or the amount of fuel and store them as the electronic data.

In addition, similarly to the second embodiment, it is preferable that the fuel cell 2 has a cell power supply controlling unit 21 corresponding to the above-mentioned power supply controlling unit 20. The other structure of the cellular phone is the same as that of the first embodiment in the cellular phone 1, the fuel cell 2, and the fuel cartridge 3.

Next, an operation sequence of the cellular phone 1 using the fuel cell according to the fifth embodiment will be described with reference to specific examples illustrated in FIGS. 17A and 17B.

(Case of Driving Fuel Cell After P2P Communication)

Figure 17A:
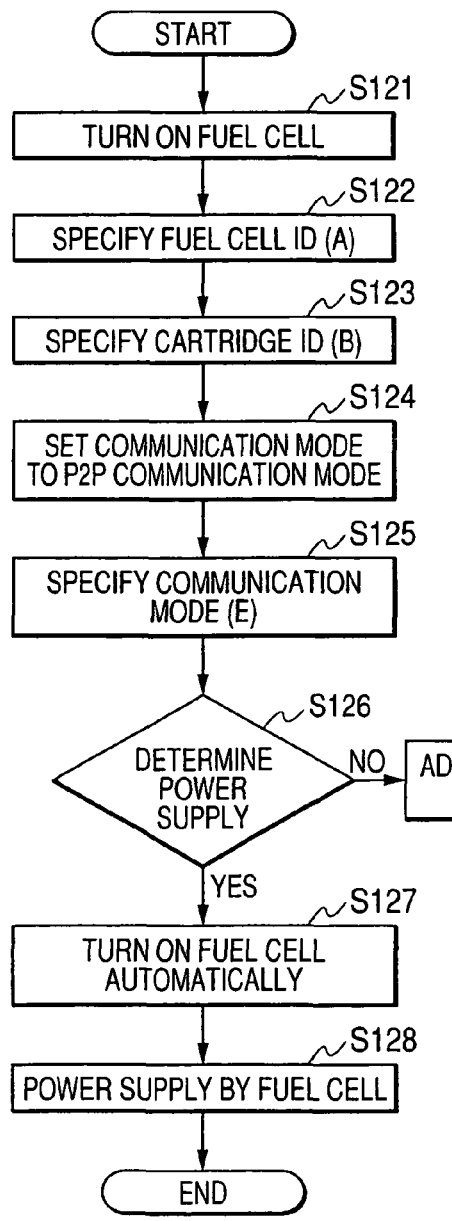
FIGS. 17A and 17B are flowcharts illustrating the operation of the communication terminal and the power supply management system of the fuel cell according the fifth embodiment of the invention.

As shown in FIG. 17A, in step S121, a power supply of the fuel cell 2 is turned on. In step S122, the ID detecting unit 5 of the cellular phone 1 detects an ID of the fuel cell 2 to specify a fuel cell ID (A). In the same manner, in step S123, the ID detecting unit 5 of the cellular phone 1 detects an ID of the fuel cartridge 3 to specify a cartridge ID (B).

After that, in step S124, a communication mode is set to the P2P communication mode. Next, in step S125, the communication mode detecting unit 23 confirms whether the communication mode is the P2P communication mode. In addition, the detection value matching unit 7 transmits data such as the collated IDs and the P2P communication mode to the power supply controlling unit 20.

Next, in step S126, the power supply controlling unit 20 may determine whether the communication mode is the P2P communication mode based on the collated data and determines the power supply. In the process of determining the power supply, when the user performs the P2P communication, a driving state of the fuel cell is automatically set to an on state in step S127. In step S128, a power is supplied to the cellular phone 1 from the fuel cell 2. In addition, the following processes are performed by the detection value matching unit 7, similarly to the fourth embodiment. Although not shown, through the cellular phone 1, various data is transmitted to a specific server determined by the communication carrier and is then stored therein.

Next, in step S126, when the P2P communication is not performed, in step S129, the cellular phone 1 is supplied with a power from a separate cell, that is, a built-in storage cell.

(Case of Performing P2P Communication After Driving Fuel Cell)

Figure 17B:
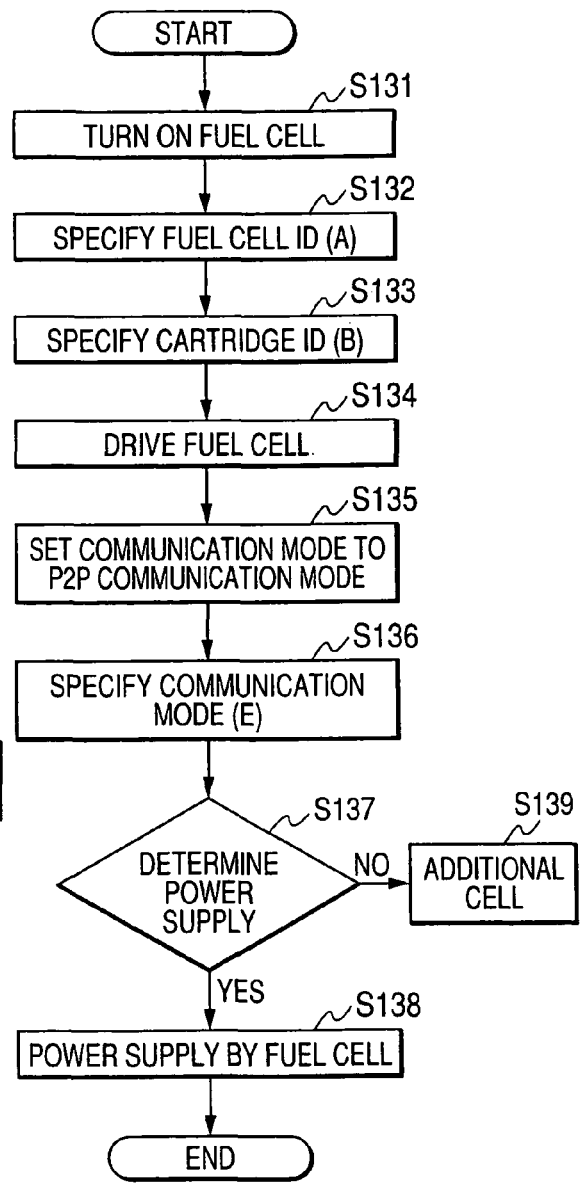

As shown in FIG. 17B, in step S131, a power supply of the fuel cell 2 is turned on. In step S132, the ID detecting unit 5 of the cellular phone 1 detects an ID of the fuel cell 2 to specify a fuel cell ID (A). In the same manner, in step S133, the ID detecting unit 5 of the cellular phone 1 detects an ID of the fuel cartridge 3 to specify a cartridge ID (B).

After that, in step S134, the driving state of the fuel cell is set to an on state to drive the fuel cell 2. Next, in step S135, a communication mode is set to the P2P communication mode. Next, in step S136, the communication mode detecting unit 23 confirms whether the communication mode is the P2P communication mode.

Next, in step S137, the power supply controlling unit 20 determines whether the communication mode is the P2P communication mode and determines the power supply, based on the data such as the P2P communication mode and the IDs collated by the detection value matching unit 7. In the process of determining the power supply, when the user performs the P2P communication, a power is supplied to the cellular phone 1 from the fuel cell 2 in step S138. In addition, the following processes are performed by the detection value matching unit 7, similarly to the fourth embodiment. Although not shown, through the cellular phone 1, various data is transmitted to a specific server determined by the communication carrier and is then stored therein.

Next, in step S137, when the P2P communication is not performed, in step S139, the cellular phone 1 is supplied with a power from a separate cell, that is, a built-in storage cell.

In the case in which the fuel cell 2 is connected and the P2P communication is performed through the cellular phone 1, by the system operation, the cellular phone 1 is automatically supplied with a power from the fuel cell 2. In this case, the same effects as the above-mentioned first embodiment can be obtained.

According to the above-mentioned embodiments, the power supply management system of the fuel cell is built in the communication terminal. However, the invention is not limited thereto. The communication terminal such as the cellular phone has improvement in a function and an increase in an information process capability. For this reason, the power supply management system can be built in the cellular phone. However, in a mobile device having a simple function like a music player, an information processing capability is small and it is difficult for the power supply management system to be built in the mobile device. In this case, a portion of the power supply management system, for example, the detection value matching unit 7 can be provided at the terminal management system side.

As such, it is not necessarily provided for the power supply management system to be built in the communication terminal. That is, the power supply management system may be provided at a specific server side determined by the communication carrier where a user can easily have access.

In addition, although not described in the above-mentioned embodiments, a secondary cell such as a lithium ion cell may be charged with the fuel cell.

The invention is not limited to the above-mentioned embodiments, but various changes and modifications will be made without departing from the spirit or scope of the invention. In the above-mentioned embodiments, the communication terminal has been described using the cellular phone. It is needless to say that the communication terminal of the invention can be applied to other systems such as a wireless LAN terminal, a wire network terminal or the like.

What is claimed is:

1. A communication terminal, to which a power is supplied from a fuel cell, comprising:
    an execution/reproduction unit that executes or reproduces a service content that is provided or supplied from a service content provider;
    an ID detecting unit that detects a fuel cell identification data indicating at least one of unique identification information of a fuel reservoir for supplying fuel to the fuel cell and unique identification information of the fuel cell;
    a content information detecting unit that detects information of the service content that is executed or reproduced by the execution/reproduction unit;
    a cell operating state detecting unit that detects an operating state of the fuel cell; and
    a matching process unit that collates and associates the fuel cell identification data, the information of the service content, and the operating state of the fuel cell.

2. The communication terminal according to claim 1, wherein the matching process unit calculates an amount of fuel consumed by executing one content in the communication terminal.

3. The communication terminal according to claim 1, wherein the data collated and associated by the matching process unit is encrypted, and
    a encrypted data is transmitted to a communication management system to which the communication terminal is connected.

4. The communication terminal according to claim 1, wherein the content information detecting unit has a function that obtains metadata of the content.

* * * * *